(12) United States Patent
Borawski et al.

(10) Patent No.: US 11,798,011 B2
(45) Date of Patent: *Oct. 24, 2023

(54) METHODS AND APPARATUS TO IDENTIFY USERS ASSOCIATED WITH DEVICE APPLICATION USAGE

(71) Applicant: The Nielsen Company (US), LLC, New York, NY (US)

(72) Inventors: Albert T. Borawski, Oldsmar, FL (US); Joseph W. Brewer, Tarpon Springs, FL (US); Brian Fuhrer, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/164,470

(22) Filed: Feb. 1, 2021

(65) Prior Publication Data

US 2021/0158379 A1    May 27, 2021

Related U.S. Application Data

(63) Continuation of application No. 14/139,281, filed on Dec. 23, 2013, now Pat. No. 10,909,551.

(51) Int. Cl.
*G06Q 30/0201* (2023.01)
*H04L 67/04* (2022.01)
(Continued)

(52) U.S. Cl.
CPC ......... *G06Q 30/0201* (2013.01); *H04L 67/04* (2013.01); *H04L 67/125* (2013.01); *H04L 67/535* (2022.05)

(58) Field of Classification Search
CPC .......................... G06Q 30/0201; H04L 67/535
See application file for complete search history.

(56) References Cited

U.S. PATENT DOCUMENTS 5,373,315 A   12/1994  Dufresne et al.
5,550,928 A   8/1996   Lu et al.
(Continued)

FOREIGN PATENT DOCUMENTS

WO    2007065069    6/2007
WO    2012056324    5/2012

OTHER PUBLICATIONS

Patent Cooperation Treaty, "International Search Report," issued in connection with International Patent Application No. PCT/US2014/067941, dated Feb. 24, 2015, 3 pages.

(Continued)

*Primary Examiner* — Renae Feacher

(57) ABSTRACT

Methods and apparatus are disclosed to identify users associated with device application usage. A disclosed example method involves obtaining demographics of persons to participate in a panel for an audience research study, identifying a set of applications to be monitored, providing devices associated with the persons in the panel with a meter to record usage of the applications and with a user-to-application associator, the user-to-application associator to define associations between the applications to be monitored and the persons associate with the device before the applications are launched, receiving data from a first one of the devices identifying a first one of the persons as a primary user of a first one of the applications in the set of applications, receiving data from the first device identifying usage of the first application, and associating the demographics of the first person with the usage of the first application.

20 Claims, 20 Drawing Sheets

(51) Int. Cl.
  *H04L 67/125* (2022.01)
  *H04L 67/50* (2022.01)

(56) References Cited

U.S. PATENT DOCUMENTS

| | | | |
|---|---|---|---|
| 5,793,409 | A | 8/1998 | Tetsumura |
| 5,945,988 | A | 8/1999 | Williams et al. |
| 6,457,010 | B1 | 9/2002 | Eldering et al. |
| 6,467,089 | B1 | 10/2002 | Aust et al. |
| 6,637,029 | B1 | 10/2003 | Maissel et al. |
| 7,698,236 | B2 | 4/2010 | Cox et al. |
| 8,091,100 | B2 | 1/2012 | Donato |
| 8,190,907 | B2 | 5/2012 | Tu |
| 10,057,354 | B2* | 8/2018 | Barnett ................ H04L 67/143 |
| 2002/0059584 | A1 | 5/2002 | Ferman et al. |
| 2002/0064787 | A1 | 5/2002 | Shuber et al. |
| 2002/0083468 | A1 | 6/2002 | Dudkiewicz |
| 2002/0174183 | A1 | 11/2002 | Saeidi |
| 2003/0040889 | A1* | 2/2003 | Coffey .................... G06F 21/00 714/E11.2 |
| 2003/0088872 | A1 | 5/2003 | Maissel et al. |
| 2003/0225696 | A1 | 12/2003 | Niwa |
| 2004/0058675 | A1 | 3/2004 | Lu et al. |
| 2006/0168613 | A1* | 7/2006 | Wood ..................... H04H 60/45 725/9 |
| 2007/0016958 | A1* | 1/2007 | Bodepudi ........... G06F 21/6218 726/28 |
| 2007/0065069 | A1 | 3/2007 | Bratkovski et al. |
| 2008/0109547 | A1* | 5/2008 | Bao ..................... G06F 11/3495 709/224 |
| 2008/0168030 | A1* | 7/2008 | Songer ................. H04W 48/18 |
| 2008/0300967 | A1 | 12/2008 | Buckley et al. |
| 2009/0132579 | A1* | 5/2009 | Kwang ................ H04L 67/535 709/224 |
| 2009/0193360 | A1* | 7/2009 | Escuer ................... H04L 43/00 709/224 |
| 2009/0241105 | A1* | 9/2009 | Perrone ................ G06F 21/105 707/999.01 |
| 2009/0241106 | A1 | 9/2009 | Perrone et al. |
| 2010/0088234 | A1* | 4/2010 | Moore ............... G06Q 30/0251 705/52 |
| 2011/0131340 | A1 | 6/2011 | Steuer et al. |
| 2011/0209143 | A1 | 8/2011 | Ierullo |
| 2011/0223894 | A1 | 9/2011 | Battiston et al. |
| 2011/0295727 | A1 | 12/2011 | Ferris et al. |
| 2011/0296000 | A1* | 12/2011 | Ferris ..................... G06Q 10/00 718/1 |
| 2012/0060104 | A1 | 3/2012 | Feng et al. |
| 2012/0072940 | A1* | 3/2012 | Fuhrer ............. H04N 21/25891 725/13 |
| 2012/0089996 | A1 | 4/2012 | Ramer et al. |
| 2012/0291101 | A1 | 11/2012 | Ahlstrom et al. |
| 2013/0065555 | A1* | 3/2013 | Baker .................. G06Q 20/405 455/410 |
| 2013/0205001 | A1* | 8/2013 | Reed ................... G06F 9/44505 709/224 |
| 2013/0222277 | A1 | 8/2013 | O'Hara |
| 2014/0280888 | A1* | 9/2014 | McMillan ............... H04L 43/04 709/224 |
| 2015/0178740 | A1 | 6/2015 | Borawski et al. |
| 2019/0182344 | A1 | 6/2019 | Bosworth et al. |

OTHER PUBLICATIONS

Patent Cooperation Treaty, "Written Opinion," issued in connection with International Patent Application No. PCT/US2014/067941, dated Feb. 24, 2015, 4 pages.

Patent Cooperation Treaty, "International Preliminary Report on Patentability," issued in connection with International Patent Application No. PCT/US2014/067941, dated Jul. 7, 2016, 6 pages.

United States Patent and Trademark Office, "Non-Final Office Action," issued in connection with U.S. Appl. No. 14/139,281, dated Dec. 9, 2015, 26 pages.

United States Patent and Trademark Office, "Non-Final Office Action," issued in connection with U.S. Appl. No. 14/139,281, dated Jun. 13, 2016, 34 pages.

United States Patent and Trademark Office, "Final Office Action," issued in connection with U.S. Appl. No. 14/139,281, dated Dec. 20, 2016, 15 pages.

United States Patent and Trademark Office, "Non-Final Office Action," issued in connection with U.S. Appl. No. 14/139,281, dated Oct. 6, 2017, 12 pages.

United States Patent and Trademark Office, "Final Office Action," issued in connection with U.S. Appl. No. 14/139,281, dated May 15, 2018, 12 pages.

United States Patent and Trademark Office, "Non-Final Office Action," issued in connection with U.S. Appl. No. 14/139,281, dated Apr. 2, 2019, 8 pages.

United States Patent and Trademark Office, "Final Office Action," issued in connection with U.S. Appl. No. 14/139,281, dated Sep. 19, 2019, 11 pages.

United States Patent and Trademark Office, "Non-Final Office Action," issued in connection with U.S. Appl. No. 14/139,281, dated Apr. 29, 2020, 13 pages.

United States Patent and Trademark Office, "Notice of Allowance and Fee(s) Due," issued in connection with U.S. Appl. No. 14/139,281, dated Sep. 23, 2020, 8 pages.

* cited by examiner

400 →

| 404 | 406 | 408 | 206 |
|---|---|---|---|
| APPLICATION | PRIMARY USER | SECONDARY USER | DEVICE ID |
| Nile Reader | Mary Doe | Jane Doe | N217 |
| XBC | Jane Doe | ... | N217 |
| Annoyed Chickens | Tommy Doe | Billy Doe | N217 |
| Nile Prime | John Doe | Jane Doe | N217 |
| pChat | Billy Doe | ... | N217 |
| Drama Central | ... | ... | N217 |

402

USER-TO-APPLICATION ASSOCIATION DATA

FIG. 4

| APPLICATION | DEVICE ID | START | END | COLLECTED DATA |
|---|---|---|---|---|
| Nile Reader | N217 | 2013-11-12T14:50Z | 2013-11-12T16:23Z | <Collected Application/Media Data> |
| XBC | N217 | 2013-11-11T06:47Z | 2013-11-11T07:17Z | <Collected Application/Media Data> |
| Annoyed Chickens | N217 | 2013-11-10T17:20Z | 2013-11-10T19:18Z | <Collected Application/Media Data> |
| Nile Prime | N217 | 2013-11-09T13:59Z | 2013-11-09T15:29Z | <Collected Application/Media Data> |
| pChat | N217 | 2013-11-08T23:15Z | 2013-11-09T00:08Z | <Collected Application/Media Data> |
| Drama Central | N217 | 2013-11-07T10:18Z | 2013-11-07T12:15Z | <Collected Application/Media Data> |

APPLICATION REPORTING DATA

FIG. 9

METHODS AND APPARATUS TO IDENTIFY USERS ASSOCIATED WITH DEVICE APPLICATION USAGE

RELATED APPLICATIONS

This patent arises from a continuation of U.S. patent application Ser. No. 14/139,281, now U.S. patent Ser. No. 10/909,551, filed on Dec. 23, 2013. U.S. patent application Ser. No. 14/139,281 is hereby incorporated herein by reference in its entirety.

FIELD OF THE DISCLOSURE

This disclosure relates generally to audience measurement, and, more particularly, to methods and apparatus to identify users associated with application usage on a device.

BACKGROUND

Advertisers, media producers, media distributors, application developers, and application publishers are often interested in the amount of consumer exposure to advertisements, applications, and/or entertainment media. Increasingly, consumers experience movies, television programming, news, songs, books, advertisements, applications, games and/or other media on different electronic devices that are capable of installing and executing software programs to access such media.

In some instances, a media research company can recruit panel members and then collect impressions indicative of the panel members' exposure to media accessed via one or more types of devices. The collected impressions can then be used to infer impressions attributable to the general public for the different media. These collected impressions can be used by application developers, service providers, media producers (e.g. producers of content and/or advertisements, etc.), and/or advertisers to better market and/or target their products and/or services.

BRIEF DESCRIPTION OF THE DRAWINGS

FIG. 4 depicts an example user-to-application association data structure that may be used to associate users with applications executed on the devices of FIGS. 1 and/or 2.

FIG. 9 depicts an example data structure that may be used to store collected application meter data.

DETAILED DESCRIPTION

Examples disclosed herein may be used to identify users that access media via different applications and/or media channels accessible on electronic devices such as tablets, smartphones, smart televisions, gaming consoles, digital media recorders, etc. For example, numerous family members of a household may share a single tablet device to access media via different applications that execute on the tablet device. For example, the father of the household may primarily use a CNN® application to view news information (e.g., text or streaming media), the mother of the household may primarily use an ABC Family® application to view episodes of different television programs, and/or each child of the household may primarily use applications related to children's media (e.g. Cartoon Network®, Nickelodeon®, etc.). To measure which member of the household is using the tablet device at any particular time, methods and apparatus disclosed herein generate user-to-application associations that may be used to identify users of applications and/or media channels when usage of such applications and/or media channels is detected on the device. In some examples, a user-identification application is executed on an electronic device to enable the member(s) of the household to indicate which member(s) of the household use which application(s) and/or media channel(s) on the electronic device.

Although this disclosure provides examples which monitor application usage on electronic devices and associate users with such applications, techniques disclosed herein can similarly be used to monitor usage of media channels (e.g. television channels and/or radio stations) such as media channels available via smart televisions, tablets, game consoles, mobile phones, smart phones, digital media recorders, computers, laptops, stereos, and/or other electronic devices.

In examples disclosed herein, the user-identification application collects a listing of applications installed on the electronic device that are to be monitored. In some examples, an audience measurement entity (AME) provides the list of applications to be monitored. In some examples, applications to be monitored are applications that have an integrated meter that facilitate tracking usage of that application. For example, the user-identification application may detect applications having such an integrated meter. In some examples, applications to be monitored may be any application having one or more particular characteristics (e.g. news-type applications, game-type applications, streaming media-type applications, productivity-type applications, developer name, publisher name, etc.), regardless of whether such applications have been expressly specified by the AME and/or regardless of whether such applications have integrated meters.

Figure 5A:
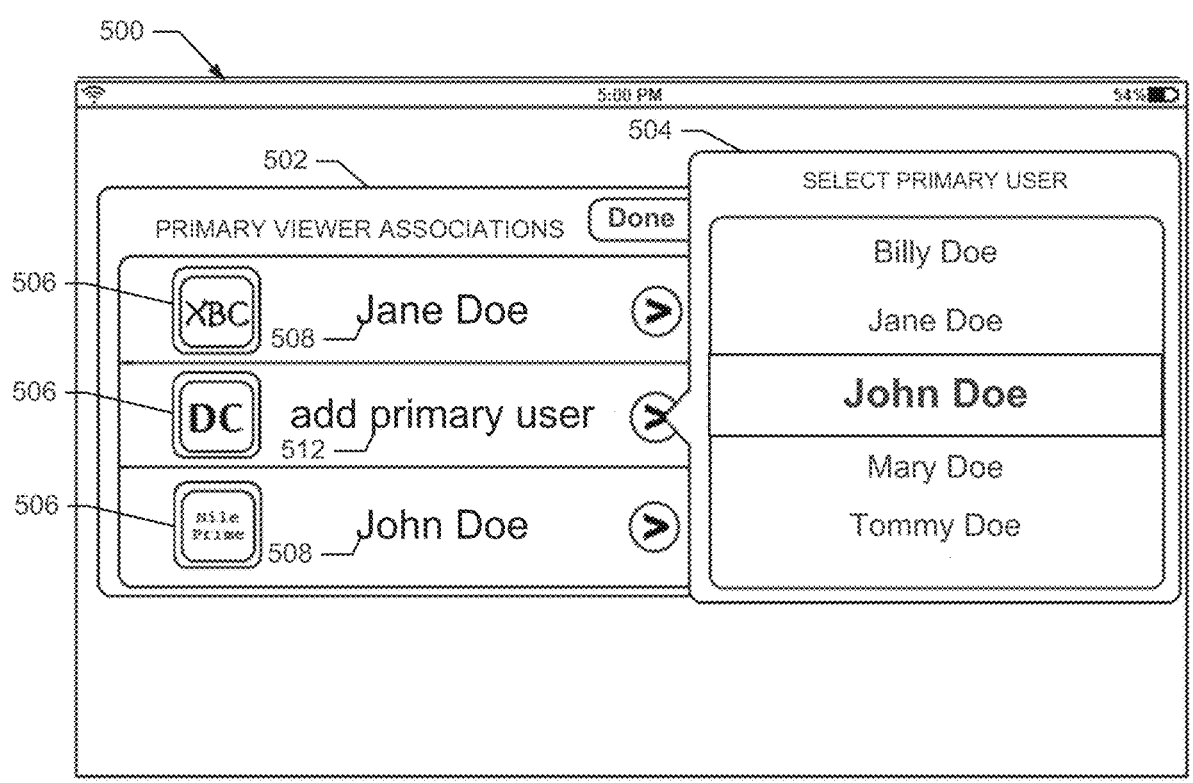
FIGS. 5A and 5B illustrate example graphical user interfaces that may be used to collect user-to-application associations.
Figure 5B:
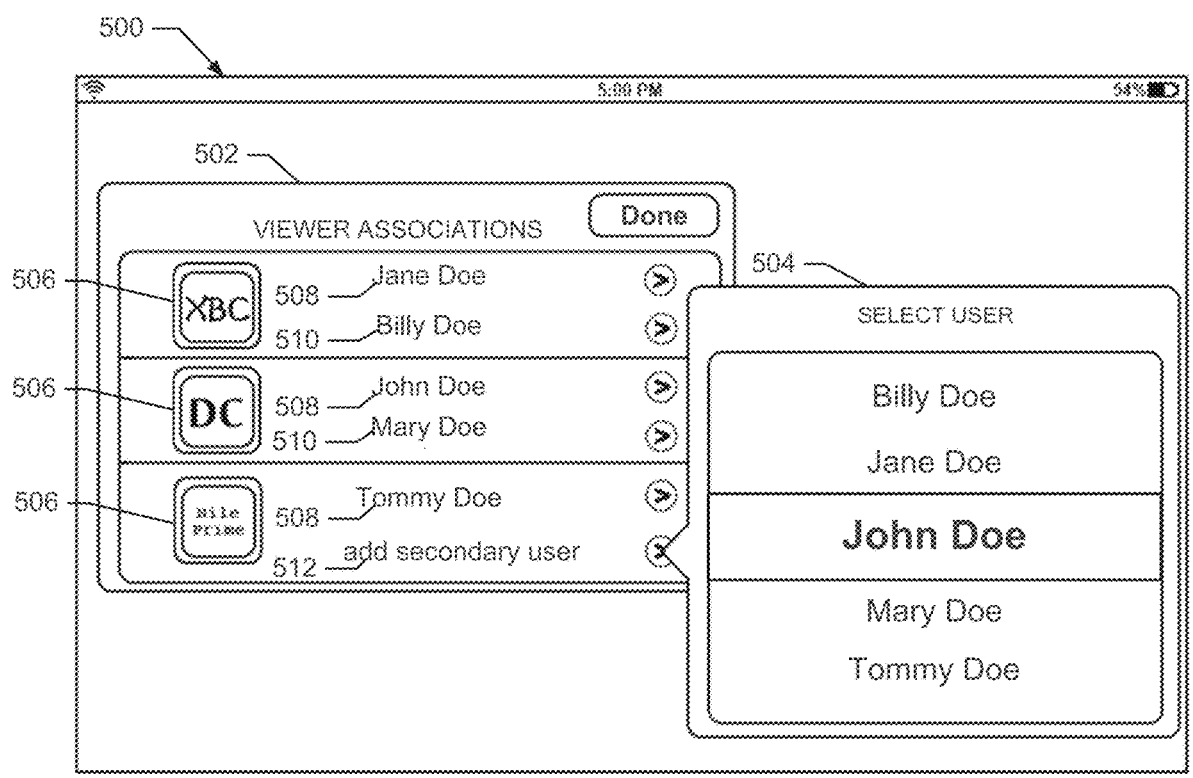

During a set-up process, the user-identification application presents a prompt with the listing of detected applications and a request for user input to indicate which household member is the primary user of which application(s). In some examples, multiple users for a particular application may be selected. FIGS. 5A and 5B discussed below show example graphical user interface screens that may be used to collect this information. In this manner, the user-identification application stores a map and/or table of user-to-application associations before the application is metered. In some examples, the user input may be is based on the user's perception of intended usage of the application(s). Once the set-up process is complete, the household members can use the device in accordance with their normal usage. The user-identification application uses the map and/or table of user-to-application associations to identify which users are likely to be using the electronic device at any given time by cross-referencing the application that is currently being executed with the map and/or table of user-to-application associations. In some examples, the map and/or table of user-to-application associations are used to associate usage of the application with the corresponding user(s) without prompting the current user(s) to self-identify (e.g., without asking the current user(s) to enter an identifier such as a name, a panelist identification number and/or press a button on a remote, etc.).

In some examples, the user-identification application allows a current user of the device to override the previously stored map and/or table of user-to-application associations for a current application usage session. In such examples, when the user identification application detects an instantiation of a to-be-monitored application, the user-identification application presents a user-interface (or causes the to-be-monitored application to present a user-interface) to allow a current user of the to-be-monitored application to select one or more household members (which may be the same of different from the user(s) identified in the map and/or table of user-to-application associations) or the current user(s) of the device. In some examples, the user-identification application stores the newly selected user-to-application associations in the map and/or table user-to-application associations for use in identifying users during subsequent instantiations of the to-be-monitored application.

In some examples, the user-identification application updates the previously recorded/collected map and/or table of user-to-application associations from time to time in response to a user launching a new to-be-monitored application. For example, when the new to-be-monitored application is launched, the user-identification application of some such examples displays a screen prompt (or the user-identification application causes the to-be-monitored application to display a screen prompt) requesting user input on which household member(s) will typically use the launched application. Additionally or alternatively, the user-identification application of some examples collects user-to-application associations in a similar manner in response to detecting that a new to-be-monitored application is installed on the device. In some examples, the user-to-application associations are collected before the new to-be-monitored application is initially launched. Such user-to-application mappings can be used for subsequent launches of the same to-be-monitored application to identify likely current users of the electronic device that should be credited with using the launched applications.

While the above examples disclose detecting to-be-monitored applications, similar techniques may be used to collect user-to-channel associations to collect and/or associations between media channels (e.g. in smart televisions, tablets, game consoles, mobile phones, smart phones, digital media recorders, computers, laptops, stereos and/or other electronic devices) and one or more primary user(s) of those channels.

Figure 1:
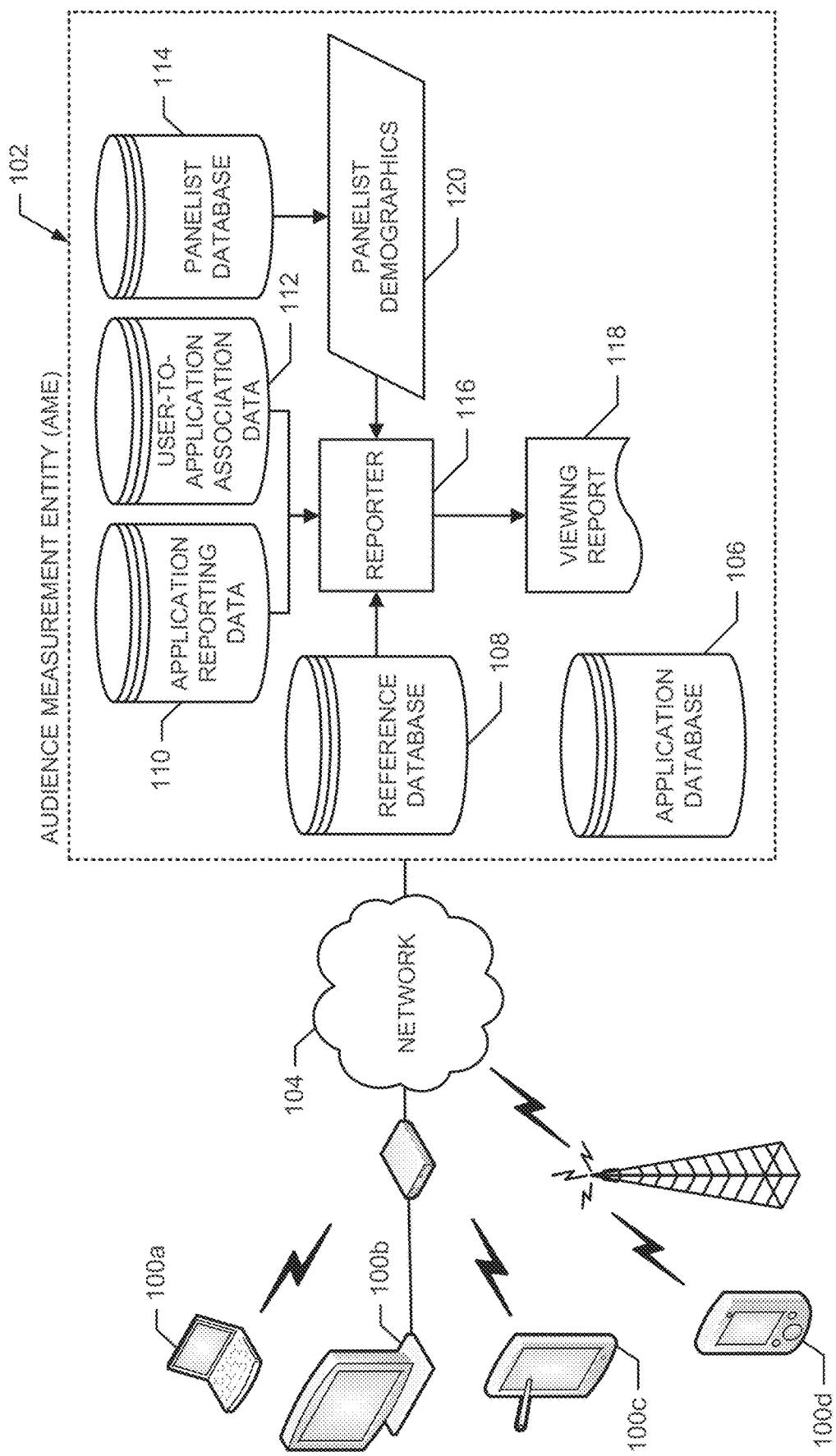
FIG. 1 illustrates an example system having devices in communication with an audience measurement entity (AME) to associate demographics with measured usage of applications on devices.

FIG. 1 illustrates example user devices 100a-100d which are monitored by an example audience measurement entity (AME) 102. The devices 100a-100d may be any device that supports applications and/or media channels (e.g. smart televisions, tablets, game consoles, mobile phones, smart phones, digital media recorders, computers, laptops, stereos and/or other electronic devices). The user devices 100a-100d may communicate with the AME 102 through a network 104 via wired and/or wireless connections (e.g. a cable/DSL/satellite modem, a cell tower, etc.).

The AME 102 of the illustrated example of FIG. 1 includes an example application database 106, an example reference database 108, an example application reporting database 110, an example user-to-application association database 112, an example panelist database 114, and an example reporter 116. In the illustrated example, the AME 102 is provided with the application database 106 to store names/titles or characteristics of to-be-monitored applications or media channels. The AME 102 of the illustrated example sends some or all of such information from the application database 106 to the devices 100a-100d. In some examples, the AME 102 maintains a list of applications to be monitored based on the names/titles and/or characteristics stored in the application database 106. In some examples, the AME 102 of the illustrated example sends some or all of the list of applications to be monitored to the devices 100a-100d.

The AME 102 of the illustrated example contacts and/or enlists panelists using any desired methodology (e.g., random selection, statistical selection, phone solicitations, Internet advertisements, surveys, advertisements in shopping malls, product packaging, etc.). Demographic information (e.g., gender, occupation, salary, race and/or ethnicity, marital status, highest completed education, current employment status, etc.) is obtained from the panelist when the panelist joins (i.e., registers for) a panel. Additionally, the demographic information may be obtained through various methods during an enrollment process (e.g., via a telephone interview, by having the panelist complete an online survey, etc.). In the illustrated example, the AME 102 is provided with the panelist database 114 to store panelist names, demographic information, and/or other information collected from panelists during the enrollment process.

The AME 102 of the illustrated example sends some or all of the panel information from the panelist database 114 to the devices 100a-100d. For example, the AME 102 may send names and ages of panel members to corresponding user devices 100a-100d associated with a household of those panel members. In some examples, from time to time, the AME 102 may receive from the user devices 100a-100d application reporting data. In some examples, the AME 102 stores the received application reporting data in the application reporting database 110. In the illustrated example, application reporting data includes identification of applications (e.g. names, etc.) executed on the devices 100a-110d and timestamps indicative of launch times and/or usage durations of the applications. In some examples, the application reporting data also includes media identifiers indicative of media (e.g., programming, content, advertisements, etc.) accessed and/or presented via the user devices 100a-100d. In some examples, the application reporting data includes channel numbers/names and/or websites accessed via the user devices 100a-100d. In some examples, the application reporting data also includes device identifiers (e.g. a device ID 206 of FIG. 2) and/or user identifiers identifying the panelist that accessed the application.

In the illustrated example, the AME 102 is provided with the user-to-application association database 112. In some examples, the AME 102 receives, periodically (e.g., in response to a timer) or aperiodically (e.g., in response to one or more events), the user-to-application associations from the example user devices 100a-100d of the illustrated example. In some examples, the AME 102 stores the received user-to-application associations in the user-to-application association database 112. The AME 102 of the illustrated example is provided with the reporter 116 to generate a viewing report 118 using information in the application reporting database 110, the user-to-application association database 112, panelist demographics 120 from the panelist database 114, and/or the reference database 108. The viewing report 118 of the illustrated example associates usage of monitored applications with panelist demographics 120 of corresponding users identified as having used the monitored application based on the user-to-application associations in the user-to-application association database 112.

Figure 2:
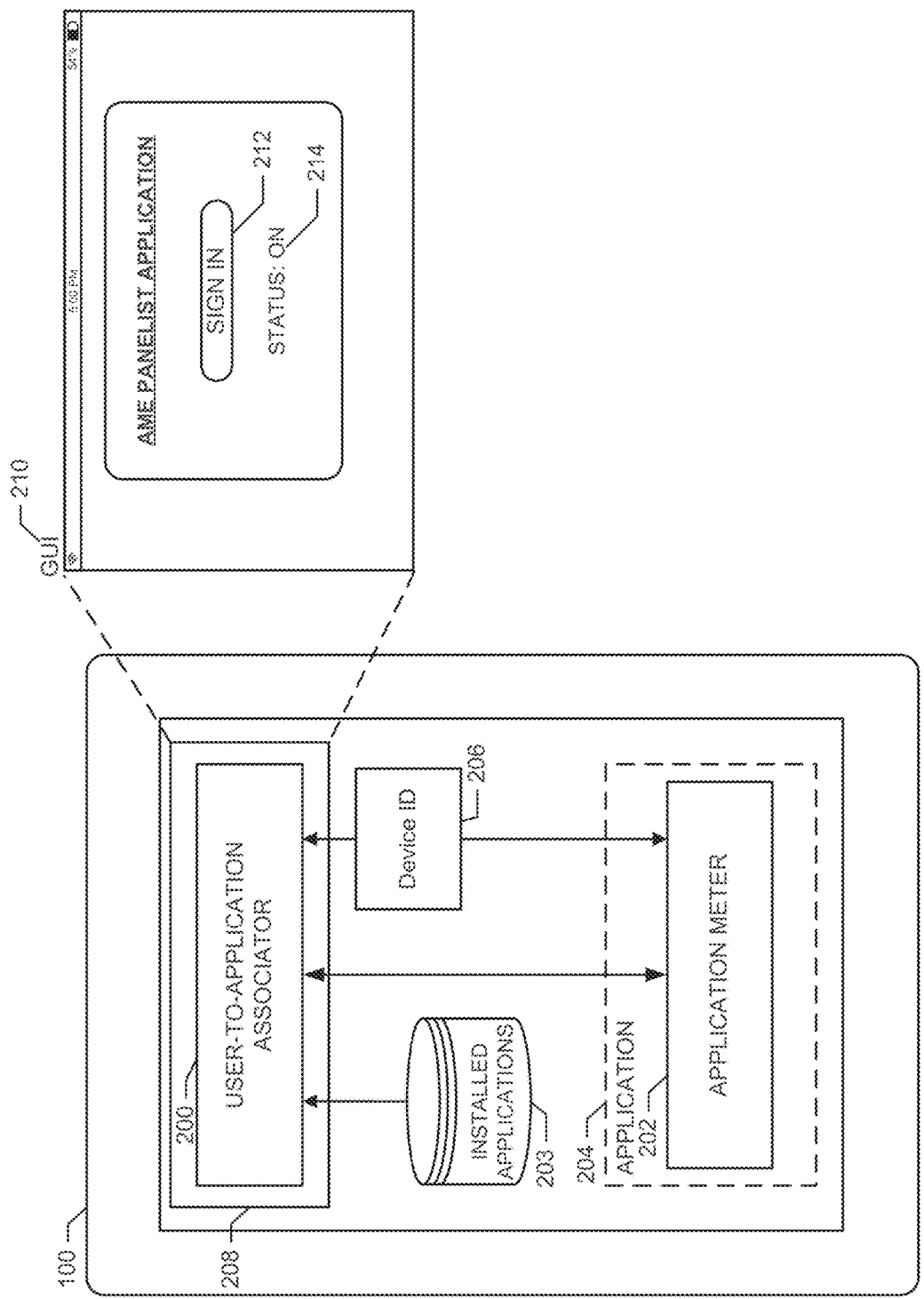
FIG. 2 illustrates an example implementation of one of the devices of FIG. 1 that may be used to track users corresponding to different applications used on the device.

FIG. 2 illustrates an example user device 100 that is representative of the user devices 100a-100d of FIG. 1. The example user device 100 is provided with an example user-to-application associator 200. In the illustrated example, the user device 100 stores installed applications 203, one of which is shown as a to-be-monitored application 204 having an example application meter 202. In some examples, the to-be-monitored application 204 is an application from an application distributor (e.g., Apple® App Store™, Google® Play, LG® Smart World™, etc.). In some examples, the to-be-monitored application 204 is integrated into the user device 100 (e.g., a set top box, etc.). In the illustrated example, an example device identifier (ID) 206 is stored in the user device 100 to allow the AME 102 to identify the particular user device 100 and distinguish it from other devices. The device ID 206 may be assigned by a manufacturer of the user device 100 (e.g., IMEI number, MAC address, etc.) or by the AME 102.

In the illustrated example, the user-to-application associator 200 interacts with a user through an example user-identification application 208. FIG. 2 illustrates an example graphical user interface (GUI) 210 provided by the user-identification application 208 to interact with users. In some examples, the AME 102 provides the example user-identification application 208 to a household member after the household member is enrolled as a panelist. While the application 204 is active (e.g., launched and running in the foreground), the application meter 202 of the illustrated example collects application reporting data and sends the application reporting data to the AME 102 to be stored in the application reporting database 110 (FIG. 1). In some examples, the application meter 202 does not collect application reporting data when a user-to-application association record does not exist for the to-be-monitored application 204. The application reporting data may be sent periodically (e.g., in response to a timer) or aperiodically (e.g., in response to one or more events). Although the application 204 is shown in the example of FIG. 2 with the integrated application meter 202, examples disclosed here to identify users of launched applications may also be used in connection with applications not having integrated meters. For example, the detecting of launched applications may be performed by the user-to-application associator 200 or may be obtained from a log file of launched applications created by the client device 100.

The user-to-application associator 200 of the illustrated example may execute in the foreground or in the background. While running in the foreground, the user-to-application associator 200 interacts with the user through the user-identification application 208 to, for example, request and/or collect user-to-application associations and/or select and/or confirm current users of the application 204. In some examples, the user-to-application associator 200 requests and/or collects a user-to-application for a to-be-monitored application before the to-be-monitored application is monitored and/or before the to-be-monitored application is installed. While running in the background, the user-to-application associator 200 of the illustrated example performs background tasks, such as detecting an initiation of the application 204 and/or detecting an installation of a new to-be-monitored application.

The example GUI 210 in FIG. 2 has an example GUI login control 212 and a status indicator 214. The login control 212 restricts access to the user-to-application associator 200 to authorized household members (e.g., the users capable of and/or permitted to make user-to-application associations). For example, in a household with household members including one or more parents and one or more children, the login control 210 may allow the parent(s) to access the user-to-application associator 200 and prevent the child(ren) from accessing the user-to-application associator 200. In some examples, the AME 102 provides access to the user-identification application 208 to authorized household members when the household members are enrolled as panelists. The example status indicator 214 of FIG. 2 indicates whether the user-to-application associator 200 is using the previously defined user-to-application associations from the map and/or table to identify likely users of launched applications and/or detecting the launch and/or installation of to-be-monitored applications.

Figure 3:
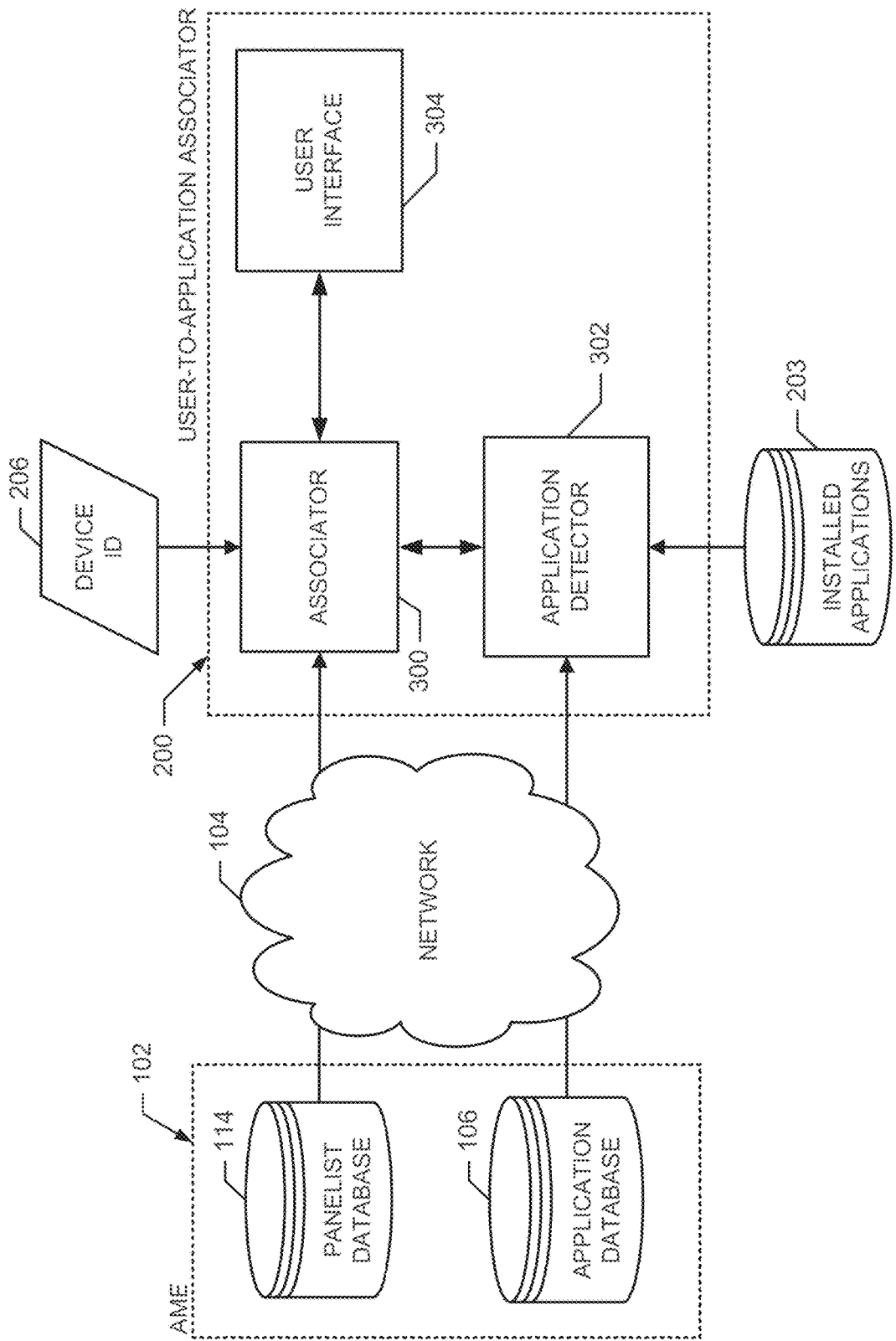
FIG. 3 illustrates an example implementation of the example user-to-application associator of FIG. 2 that may be used to associate users with applications on the devices of FIGS. 1 and 2.

FIG. 3 illustrates an example implementation of the example user-to-application associator 200 of FIG. 2. The example user-to-application associator 200 of FIG. 3 is provided with an example associator 300 in communication with an example application detector 302 and an example user interface 304. The application detector 302 of the illustrated example receives application names/titles and/or characteristics of to-be-monitored applications from the application database 106 at the AME 102 via, for example, the network 104. In some examples, the example application detector 302 receives a list of applications to be monitored from the AME 102. The example application detector 302 compares received names/titles, characteristics and/or list of application to be monitored to the installed applications 203 on the device 100 to detect to-be-monitored applications (e.g., the to-be-monitored application 204 of FIG. 2) installed on the user device 100. In the illustrated example, when the application database 106 at the AME 102 is updated, the application detector 302 receives updated application names/titles and/or characteristics of to-be-monitored applications and performs a detection process (e.g., reperform the process) to determine whether any of the newly added to-be-monitored applications in the application database 106 are installed on the user device 100. The example application detector 302 of FIG. 3 provides to the associator 300 a listing of to-be-monitored applications that are detected as installed on the user device 100.

The associator 300 of the illustrated example retrieves the device ID 206 from the user device 100. The example associator 300 may also receive panelist information (e.g. names and/or identifiers, ages, etc.) from the panelist database 114 of the AME 102 via, for example, the network 104. Using the device ID 206 and the panelist information from the panelist database 114, the associator 300 of the illustrated example generates a listing of eligible users associated with the user device 100 (e.g., household members of a household with which the user device 100 is associated).

The example associator 300 of FIG. 3 provides the listing of detected to-be-monitored applications and the listing of eligible users to the example user interface 304. The user interface 304 of the illustrated example prompts a user to provide selection and/or confirmations of primary users of the detected to-be-monitored applications. The example user interface 304 may receive user-provided selections and/or confirmations and provides the selections and/or confirmations to the associator 300. Based on the received selections and/or confirmations, the associator 300 of the illustrated example creates and/or updates the map and/or table of user-to-application associations. In the illustrated example, the associator 300 sends the user-to-application associations in connection with the device ID 206 to the AME 102 for storing in the user-to-application association database 112 of FIG. 1.

While an example manner of implementing the user-to-application associator 200 of FIG. 2 is illustrated in FIG. 3, one or more of the elements, processes and/or devices illustrated in FIG. 3 may be combined, divided, re-arranged, omitted, eliminated and/or implemented in any other way. Further, the example associator 300, the example application detector 302, the example user interface 304 and/or, more generally, the example user-to-application associator 200 of FIGS. 2 and 3 may be implemented by hardware, software, firmware and/or any combination of hardware, software and/or firmware. Thus, for example, any of the example associator 300, the example application detector 302, the example user interface 304 and/or, more generally, the example user-to-application associator 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example associator 300, the example application detector 302, and/or the example user interface 304 is/are hereby expressly defined to include a tangible computer readable storage device or storage disk such as a memory, a digital versatile disk (DVD), a compact disk (CD), a Blu-ray disk, etc. storing the software and/or firmware. Further still, the example user-to-application associator 200 of FIGS. 2 and 3 may include one or more elements, processes and/or devices in addition to, or instead of, those illustrated in FIG. 3 and/or may include more than one of any or all of the illustrated elements, processes and devices.

FIG. 4 depicts an example data structure 400 including example user-to-application associations 402 generated by the example user-to-application associator 200 of FIGS. 2 and 3. Each of the user-to-application associations 402 of the illustrated example stores an application identifier 404 corresponding to one of the to-be-monitored applications, such as the application 204 of FIG. 2, installed on the user device 100. In the illustrated example of FIG. 4, the example application identifier 404 is a name/title of the application 204. However, the application identifier 404 may be any value that uniquely identifies an application to-be-monitored. For example, the application identifier 404 may be an alphanumeric value assigned to the application 204 by an application developer, an application distributor and/or the AME 102.

The example data structure 400 of FIG. 4 is an example portion of example user-to-application data generated by the example user-to-application associator 200 and transmitted to the example AME 102 for storing in the example user-to-application association database 112 (FIG. 1). The example user-to-application associator 200 of the illustrated example stores example primary user identifiers 406 and secondary user identifiers 408 in the example data structure 400. As shown in FIG. 4, the primary user identifiers 406 and/or the secondary user identifiers 408 may be names. However, the primary user identifiers 406 and/or the secondary user identifiers 408 may be any values that uniquely identify user(s) associated with the application 204, such as an alphanumeric value assigned by the example AME 102 or any other suitable entity. Although, the illustrated example of FIG. 4 depicts the example data structure 400 as storing the primary user identifiers 406 and the secondary user identifiers 408, the data structure 400 may additionally or alternatively store fewer or more user names or user identifiers in association with each of the to-be-monitored applications (e.g., a single user identifier, a tertiary user identifier, a quaternary user identifier, etc.). For each of the example application identifiers 404, the example data structure 400 of FIG. 4 stores the device ID 206 of the example user device 100 executing the example user-to-application associator 200.

FIGS. 5A and 5B illustrate an example GUI 500 that can be displayed by the user-identification application 208 (FIG. 2) to collect user-selections of application names/titles and user names/identifiers. For example, the user-to-application associator 200 of FIG. 2 may request the user-identification application 208 to display the GUI 500 during the execution of the example program 1100 of FIG. 11. The example GUI 500 of FIG. 5 is provided with an example application selection interface 502 and an example user name selection interface 504. In the illustrated example, the application selection interface 502 displays application icons (and/or names/titles) 506 corresponding to to-be-monitored applications installed on the monitored user device 100.

In the illustrated example of FIG. 5A, the example application selection interface 502 displays primary users 508 already associated with the to-be-monitored applications in the map and/or table of user-to-application associations. In the illustrated example of FIG. 5B, the example application selection interface 502 displays the primary users 508 and secondary users 510 already associated with the to-be-monitored applications in the map and/or table of user-to-application associations that store multiple users per application. The example application selection interface 502 displays an indicator 512 shown in FIGS. 5A and 5B to indicate that one or more of the to-be-monitored applications is/are not associated with a primary user 508 and/or a secondary user 510. The example indicator 512 may be a word, a phrase, a symbol, an icon and/or any other feature to show the absence of a user name/identifier.

As illustrated in FIGS. 5A and 5B, the example user-identification application 208 displays the user selection interface 504 to display a list of users eligible for association with applications. In the illustrated example, a user may select an application name/title and a user name/identifier using any input device of the example user device 100 (e.g., a mouse, a remote control, a touchscreen, buttons, a motion sensor, a keyboard, gestures, etc.).

Figure 6:
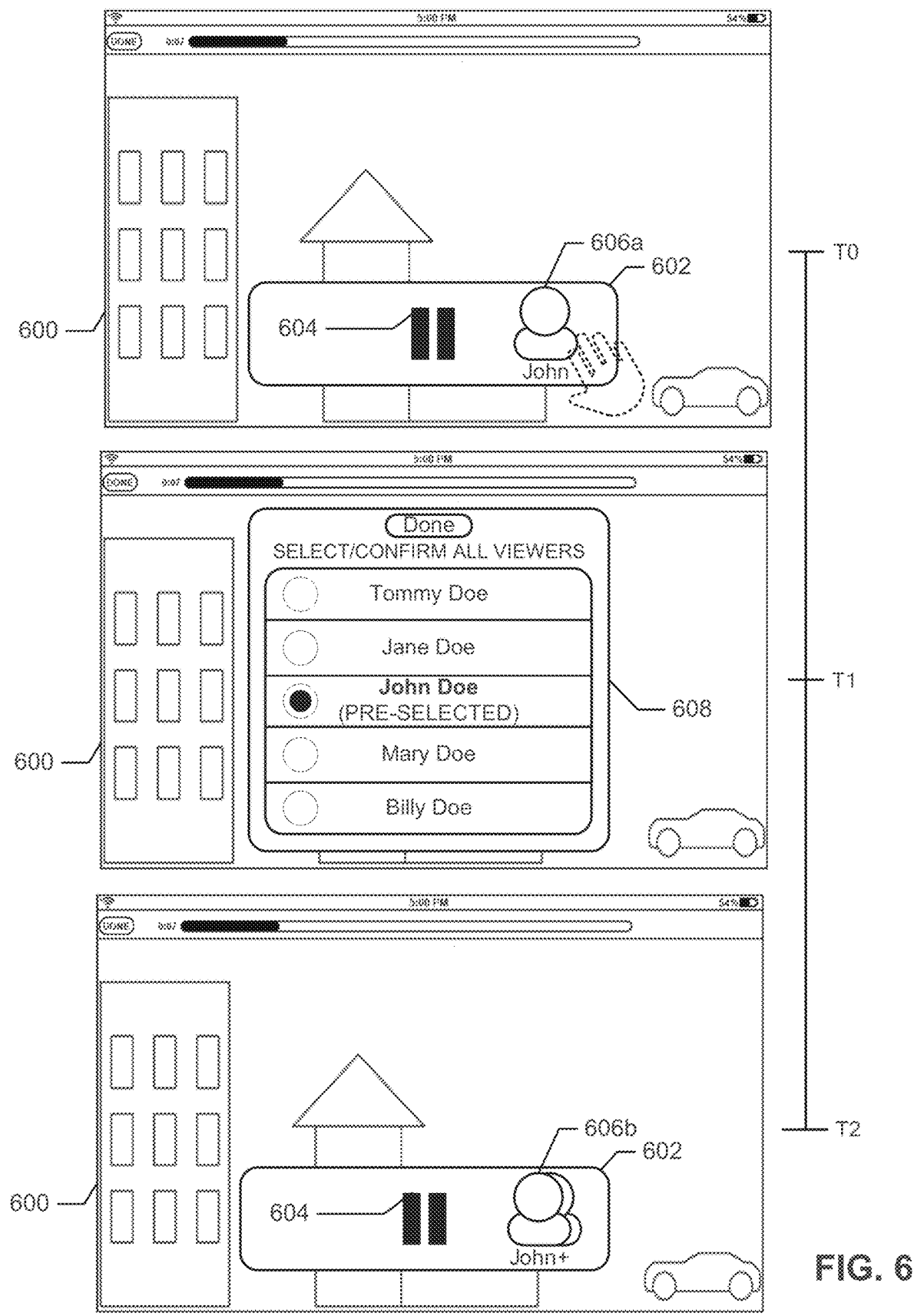
FIG. 6 illustrates another example graphical user interface that may be used to confirm user-to-application associations and/or to perform real-time collecting of user-to-application associations.

FIG. 6 depicts an example GUI 600 displayed by the example application 204 (FIG. 2). At a first time T0 of the illustrated example, the example GUI 600 displays an example application control panel 602 with example application controls 604. An example user icon 606a is provided in the example application control panel 602 to display user name(s)/identifier(s) of the user(s) listed or stored in a previously stored user-to-application association record corresponding to the application 204. The current user(s) of the user device 100 may interact with the user icon 606a to indicate that the current user(s) do(es) not match the user name(s)/identifier(s) displayed with the user icon 606a.

At a second time T1, after a user selects the example user icon 606a, the example GUI 600 displays a user selection/confirmation screen 608 that displays the list of eligible users. In the example GUI 600, the user name(s)/identifier(s) stored in a previously stored user-to-application association record for the current application are preselected and shown on the user selection/confirmation screen 608. The current user(s) of the device 100 may then confirm the preselected name(s)/identifier(s) of the current user(s) if the preselected name(s)/identifier(s) is/are of the current user(s). Additionally or alternatively, the current user(s) can select additional or alternative name(s)/identifier(s) from the list of eligible users if the preselected name(s)/identifier(s) is/are not accurate and/or do not list all of the current user(s).

At a third time T2, after the current user(s) confirm and/or select name(s)/identifier(s) of the current user(s), the GUI 600 of the illustrated example displays the application control panel 602. In this example, at time T2, an example multiple-user icon 606b may display multiple names/identifiers of the current users if multiple names/identifiers are selected at time T1. Otherwise, the user icon 606a can be displayed at time T2 if only a single name/identifier was selected/confirmed at time T1.

Figure 7:
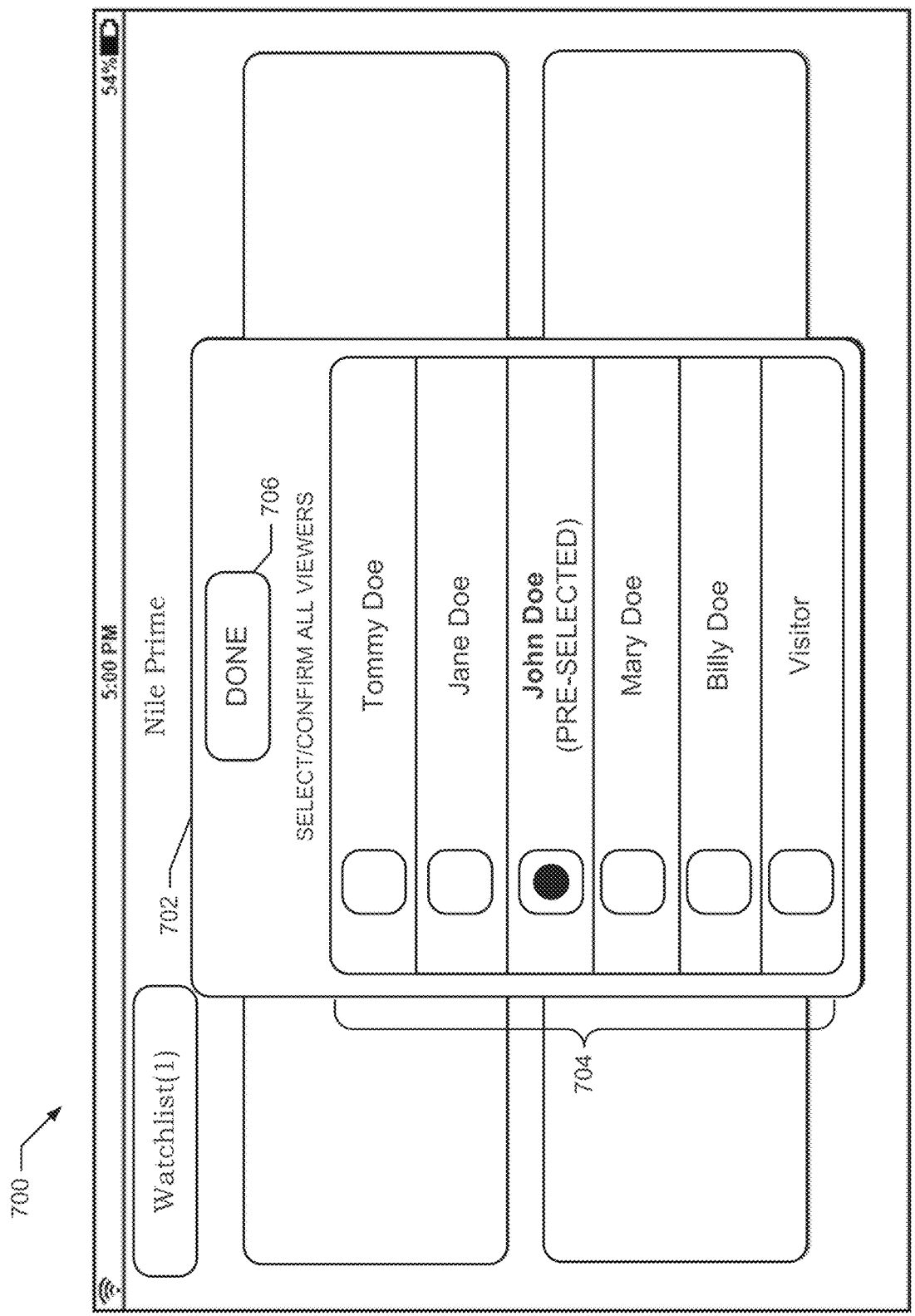
FIG. 7 illustrates another example graphical user interface that may be used to collect user-to-application associations and/or to perform real-time collecting of user-to-application associations.

FIG. 7 illustrates an example GUI 700 that is displayed by the user-identification application 208 (FIG. 2), after a to-be-monitored application (e.g., the application 204 of FIG. 2) is launched to confirm/select user name(s)/identifier(s). The example GUI 700 displays a user selection/confirmation panel 702 that shows example selectable user name(s)/identifier(s) 704 from, for example, a list of eligible users (e.g., members of a household). In the example GUI 700, one of the selectable user name(s)/identifier(s) 704 corresponding to a previously stored user-to-application association record is indicated as pre-selected on the user selection/confirmation panel 702. The GUI 700 of the illustrated example is also provided with a confirmation/selection button 706 to communicate a user-input confirmation/selection to the user interface 304 (FIG. 3).

Figure 8:
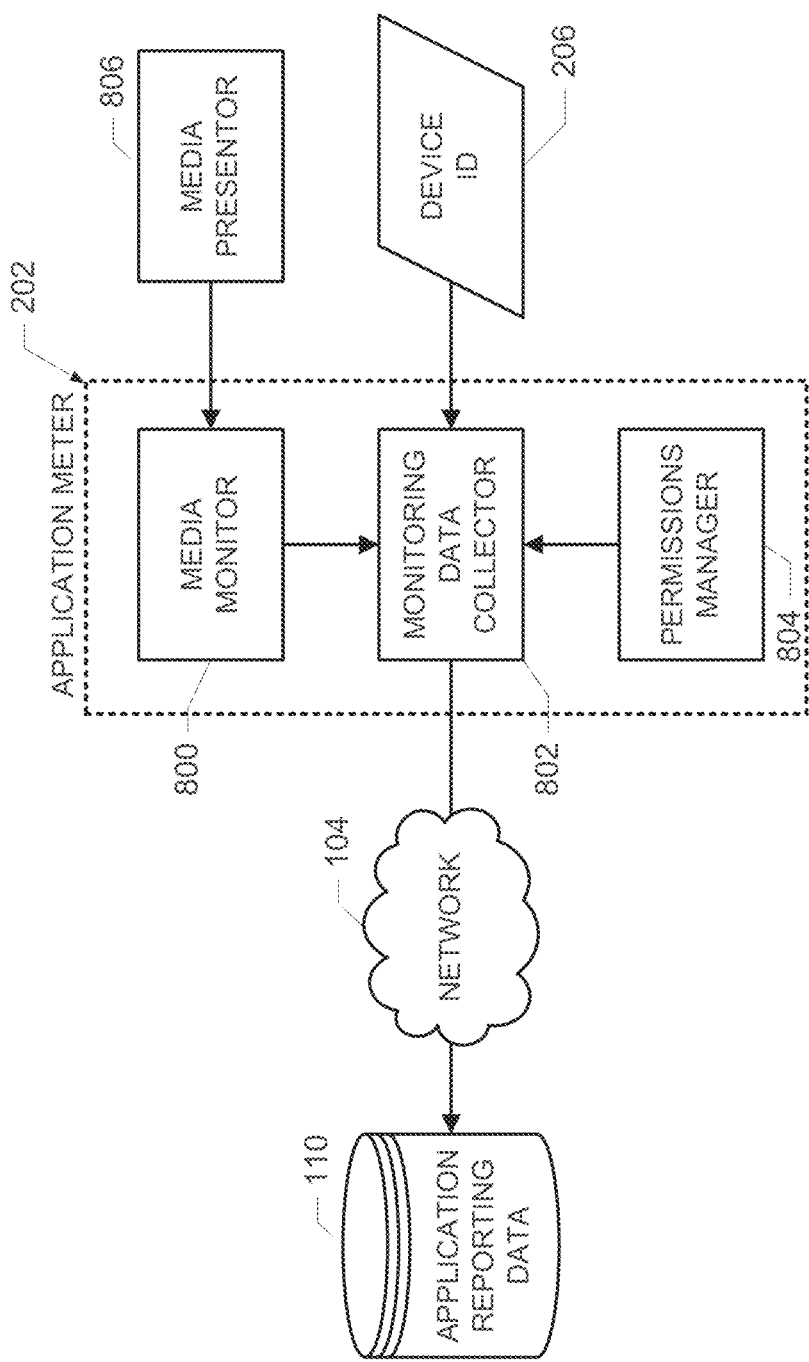
FIG. 8 illustration an example implementation of the example application meter of FIG. 4 which may be used to meter application data.

FIG. 8 illustrates an example application meter (e.g., the application meter 202 of FIG. 2) that may be integrated into an application (e.g. the application 204 of FIG. 2). In some examples, the application meter 202 is embedded into the application 204 through a software development kit (SDK). The example application meter 202 is provided with an example media monitor 800, an example monitoring data collector 802, and an example permissions manager 804. The media monitor 800 of the illustrated example extracts collected application/media data (e.g., signatures, watermarks, media-identifying metadata, etc.) from the media presented by the media presenter 806. In some examples, the media monitor 800 implements functionality provided by the SDK to extract the collected application/media data. In some examples, the example media monitor 800 determines (e.g., extracts, transforms, derives, decodes, converts, etc.) media-identifying metadata (e.g., such as media identifying information, source identifying information, watermarks, codes, etc.) associated with, and/or transmitted with the media (e.g., in an ID3 tag, in a Hypertext Transfer Protocol (HTTP) Live Streaming (HLS) manifest, in an Moving Pictures Experts Group version 2 (MPEG2) transport stream, in a timed text track, in an encryption key associated with the media, etc.).

The monitoring data collector 802 of the illustrated example correlates the collected application/media data from the example media monitor 800 with the device ID 206 of the example user device 100 executing the to-be-monitored application to generate application metering data. In some examples, the monitoring data collector 802 associates an application identifier and/or one or more timestamps with the collected application/media data as discussed below in FIG. 9. Periodically (e.g. in response to a timer, etc.) or aperiodically (e.g. in response to a request, etc.), the example monitoring data collector 802 of FIG. 8 sends the application metering data to be stored in, for example, the application reporting database 110 of FIG. 1. The application metering data may be sent via the network 104.

To protect privacy of the user(s) of the user device 100, the example permissions manager 804 of FIG. 8 enables the monitoring data collector 802 when the users (e.g., the household member/panelists associated with the user device 100) have granted consent to be monitored. In some examples, the users may grant consent when enrolled as a panelist. In some examples, the users may grant consent through a registration application and/or a registration website. In some examples, the users may grant consent through the user-identification application 208 (FIG. 2). A more detailed discussion of the application meter 202 can be found in U.S. patent application Ser. No. 13/828,971, which is hereby incorporated by reference.

While an example manner of implementing the application meter 202 of FIG. 2 is illustrated in FIG. 8, one or more of the elements, processes and/or devices illustrated in FIG. 8 may be combined, divided, re-arranged, omitted, eliminated and/or implemented in any other way. Further, the example media monitor 800, the example monitoring data collector 802, the example permissions manager 804 and/or, more generally, the example application meter 202 of FIGS. 2 and 8 may be implemented by hardware, software, firmware and/or any combination of hardware, software and/or firmware. Thus, for example, any of the example media monitor 800, the example monitoring data collector 802, the example permissions manager 804 and/or, more generally, the example application meter 202 of FIGS. 2 and 8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media monitor 800, the example monitoring data collector 802, the example permissions manager 804 is/are hereby expressly defined to include a tangible computer readable storage device or storage disk such as a memory, a digital versatile disk (DVD), a compact disk (CD), a Blu-ray disk, etc. storing the software and/or firmware. Further still, the application meter of FIGS. 2 and 8 may include one or more elements, processes and/or devices in addition to, or instead of, those illustrated in FIG. 8 and/or may include more than one of any or all of the illustrated elements, processes and devices.

FIG. 9 depicts an example data structure 900 generated by the example application meter 202 (FIGS. 2 and 8). The example data structure 900 of FIG. 9 includes application identifiers 902 corresponding to usage entries 904 of to-be-monitored applications that have the application meter 202 (e.g., application 204 of FIGS. 2 and 8). In the illustrated example of FIG. 9, the example data structure 900 stores an application identifier 902 as a name/title of the application 204. The example application identifier 902 used by the application meter 202 on data structure 900 may be the same as the example application identifier 404 (FIG. 4) used by the user-to-application associator 200 (FIGS. 2 and 3) in connection with the example data structure 400 for the corresponding to-be-monitored applications.

As illustrated in FIG. 9, the example data structure 900 stores the device identifier 206 of the example user device 100 executing the to-be-monitored application. The example data structure 900 also stores a start timestamp 906 and an end timestamp 908 for each usage entry 904. The start timestamp 906 and the end timestamp 908 may be in any form defined by the AME 102. As illustrated in FIG. 9, the example data structure 900 stores application/media data 910 collected by the application meter 202. In some examples, the collected application/media data may be media-identifying metadata, codes, signatures, watermarks, and/or other information that may be used to identify media presented through the to-be-monitored application on the user device 100 (e.g., a song being played through a music application, a movie being watched through a streaming application, etc.). The example application meter 202 may from time to time send the application reporting data included on the example data structure 900 to be stored in the application reporting database 110.

Figure 10:
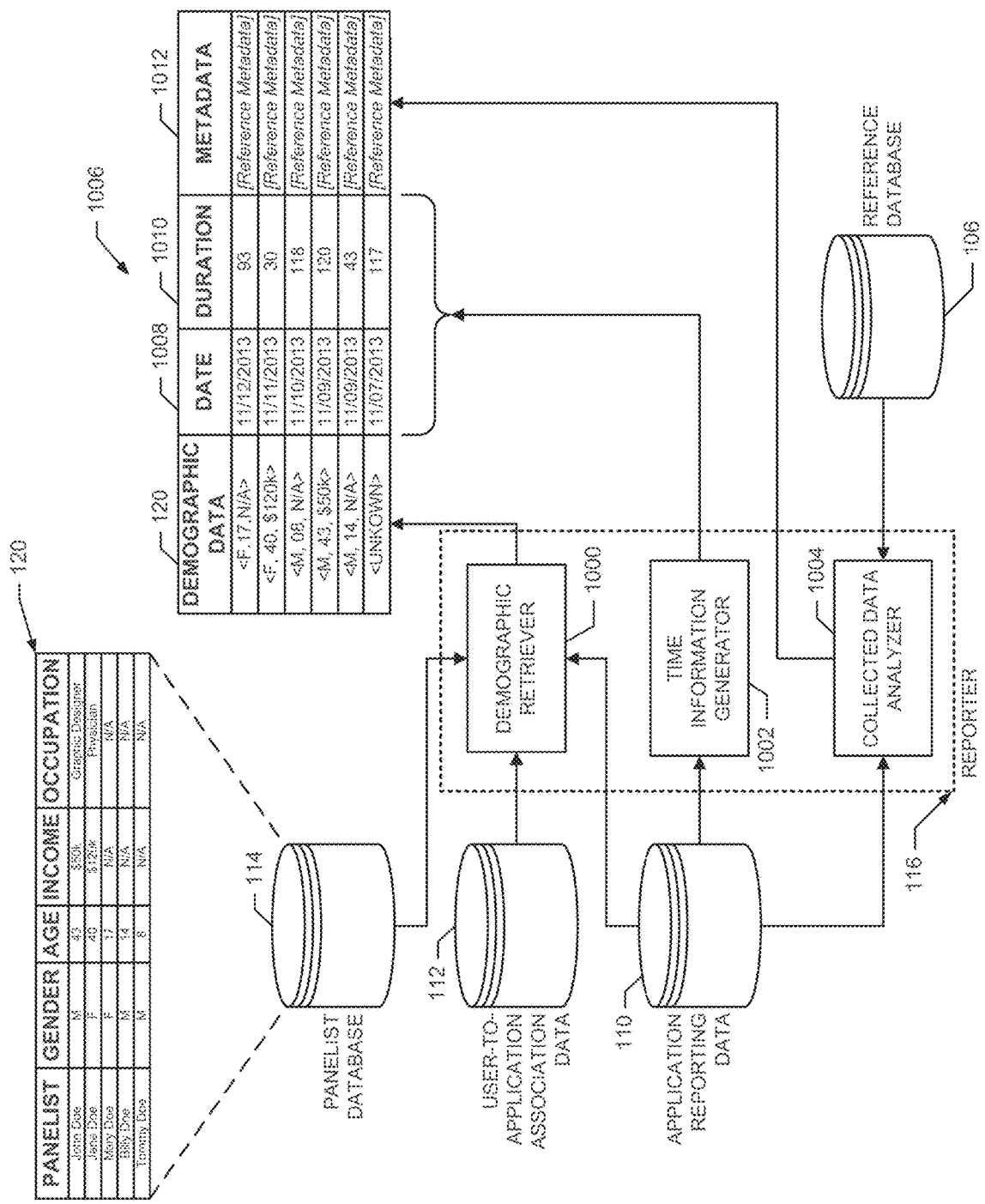
FIG. 10 illustrates an example implementation of the example reporter of FIG. 1 which may be used to associate demographic information with collected application usage information.

FIG. 10 illustrates the example reporter 116 of FIG. 1 that generates viewing reports 118 (FIG. 1) using example demographic data 120 from the panelist database 114, application reporting data from the example application reporting database 110, and user-to-application associations from the example user-to-application association database 112. The reporter 116 of the illustrated example has an example demographic retriever 1000, an example time information generator 1002, and/or an example collected data analyzer 1004. In the illustrated example of FIG. 10, the example demographic retriever 1000, the example time information generator 902, and the example collected data analyzer 1004 generate an example viewing report 1006 for a corresponding device (e.g., one of the devices 100a-100d of FIG. 1). The example viewing report 1006 of the illustrated example is stored on an example viewing report data structure 1006.

In the illustrated example of FIG. 10, the example demographic retriever 1000 receives the example panelist demographics 120 from the panelist database 114 for the list of eligible users associated with the example device 100 (FIG. 2). The example demographic retriever 1000 also receives user-to-association data corresponding the device ID 206 of the example device 100 from the user-to-application association database 112, and the application reporting data corresponding to the device ID 206 from the application reporting database 110. The demographic retriever 1000 of the illustrated example combines the panelist demographics 120, the user-to-application association data associated with the example device 100 and the application reporting data associated with the example device 100. The example demographic retriever 1000 correlates the demographic data 120 with application usage in the application reporting data (e.g. from the data structure 900 of FIG. 9) associated with the device 100. In the illustrated example, the example reporter 116 stores the correlated demographic data 120 in the example data structure 1006. The data collected and/or stored in the example data structure 1006 may be processed using statistical methods to determine ratings, usage statistics and/or exposure statistics (e.g., reach and/or frequency) for one or more populations represented by the panel or a subset of the panel.

In the illustrated example of FIG. 10, the example time information generator 1002 retrieves a start timestamp 906 (FIG. 9) and a corresponding end timestamp 908 (FIG. 9) from the application reporting data associated with the example device 100. The example time information generator 1002 of the illustrated example calculates a date 1008 and/or a duration 1010 for usage of a corresponding application usage 902 based on the retrieved timestamps. Additionally or alternatively, the example time information generator 1002 may calculate either the date 1008, the duration 1010, and/or any other time-based value. In the illustrated example of FIG. 10, the duration 1010 is in minutes. However, the duration may be calculated and/or stored in any unit (e.g., seconds, milliseconds, fractions of an hour, etc.). In the illustrated example, the example reporter 116 stores the date 1008 and the duration 1010 in the example data structure 1006 in association with corresponding demographic data 120.

The example collected data analyzer 1004 retrieves the collected application/media data 910 (FIG. 9) corresponding to the example device 100 from the application reporting data in the application reporting database 110. The collected data analyzer 1004 then looks up reference metadata 1012 (e.g., application developer, application publisher, media delivery provider, application name/title, application identifier, media channel, media titles, etc.) corresponding the collected application/media data 912 from reference database 106. In the illustrated example, the example reporter 116 stores the retrieved reference metadata 1012 in the example data structure 1006 in association with corresponding demographic data 120, a date 1008, and a duration 1010.

While an example manner of implementing the reporter 116 of FIG. 1 is illustrated in FIG. 10, one or more of the elements, processes and/or devices illustrated in FIG. 10 may be combined, divided, re-arranged, omitted, eliminated and/or implemented in any other way. Further, the example demographic retriever 1000, the example time information generator 1002, the example collected data analyzer 1004 and/or, more generally, the example reporter 116 of FIGS. 1 and 10 may be implemented by hardware, software, firmware and/or any combination of hardware, software and/or firmware. Thus, for example, any of the example demographic retriever 1000, the example time information generator 1002, the example collected data analyzer 904 and/or, more generally, the example reporter 116 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example demographic retriever 1000, the example time information generator 1002, and/or the example collected data analyzer 1004 is/are hereby expressly defined to include a tangible computer readable storage device or storage disk such as a memory, a digital versatile disk (DVD), a compact disk (CD), a Blu-ray disk, etc. storing the software and/or firmware. Further still, the example reporter 116 of FIGS. 1 and 10 may include one or more elements, processes and/or devices in addition to, or instead of, those illustrated in FIG. 10 and/or may include more than one of any or all of the illustrated elements, processes and devices.

Figure 16:
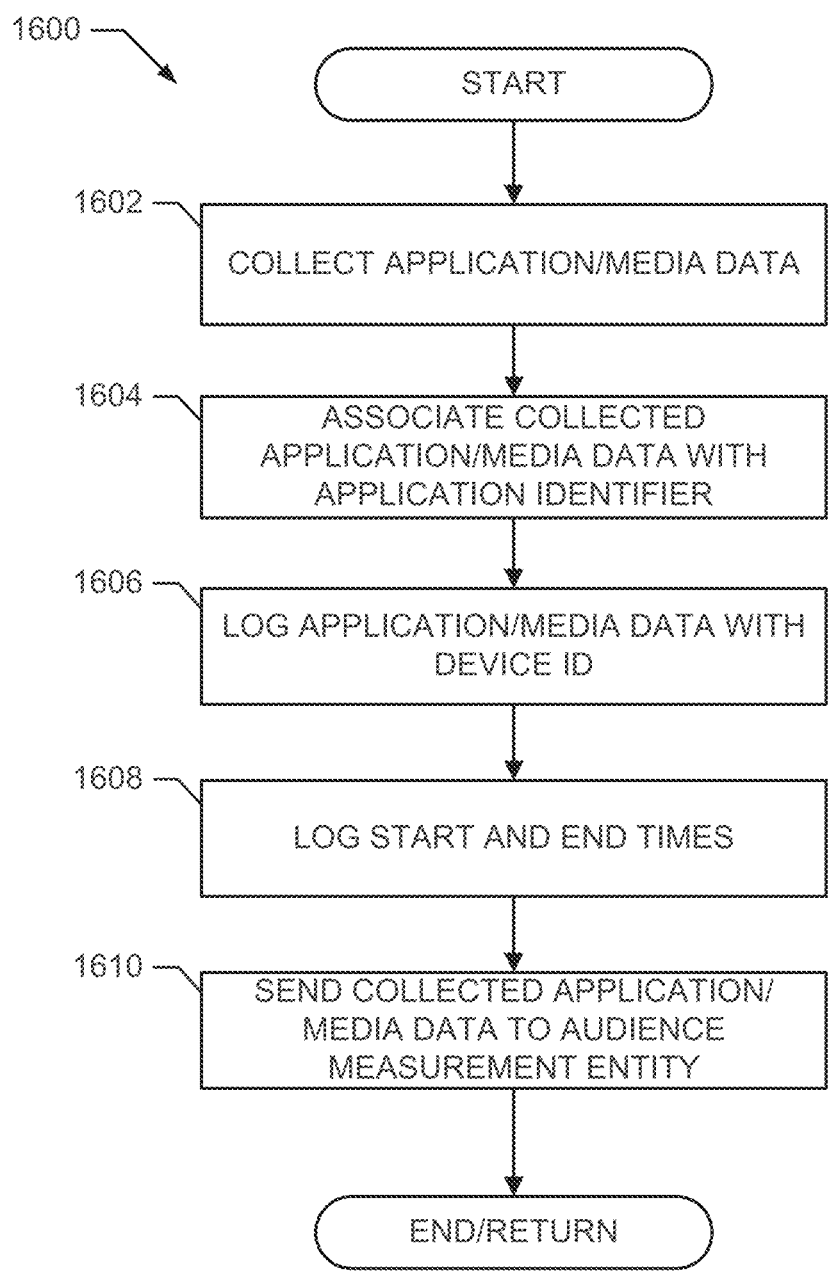
FIG. 16 is a flow diagram representative of example machine readable instructions that may be executed to implement the example application meter of FIG. 8 to meter application usage.
Figure 17:
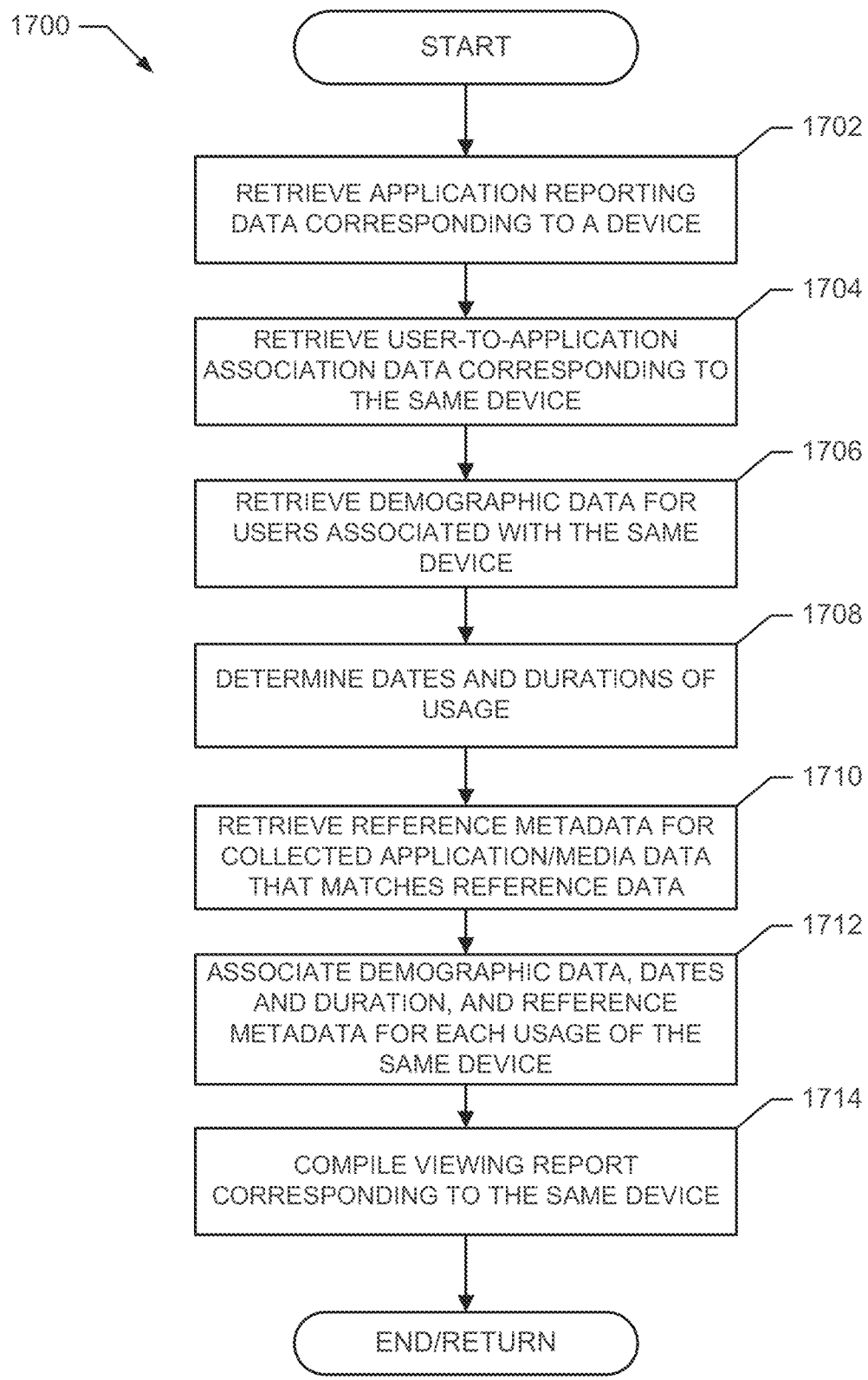
FIG. 17 is a flow diagram representative of example machine readable instructions that may be executed to implement the example reporter of FIG. 9 to associate demographic information with collected application usage information.
Figure 18:
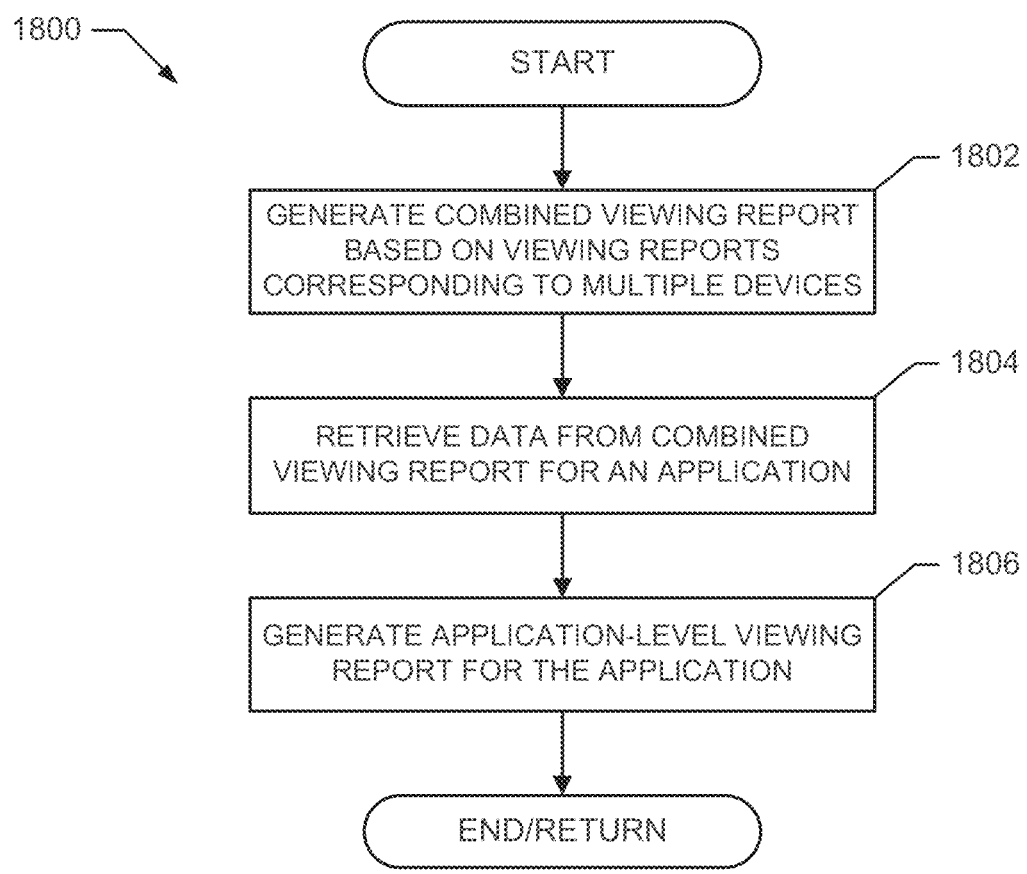
FIG. 18 is a flow diagram representative of example machine readable instructions that may be executed implement the example reporter of FIG. 9 to compile application-level viewing reports.

Flowcharts representative of example machine readable instructions for implementing the user-to application associator 200 of FIGS. 2 and 3 are shown in FIGS. 11, 12, 13, 14, and 15. A flowchart representative of example machine readable instructions for implementing the application meter 202 of FIGS. 2 and 8 is shown in FIG. 16. Flowcharts representative of example machine readable instructions for implementing the reporter 116 of FIGS. 1 and 9 are shown in FIGS. 17 and 18. In these examples, the machine readable instructions comprise programs for execution by a processor such as the processor 1912 shown in the example processor platform 1900 discussed below in connection with FIG. 19. The programs may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example programs are described with reference to the flowcharts illustrated in FIGS. 11-18 many other methods of implementing the example user-to application associator 200, the example application meter 200, and/or the example reporter 116 may alternatively be used. For example, the order of execution of the blocks may be changed, and/or some of the blocks described may be changed, eliminated, or combined.

Figure 11:
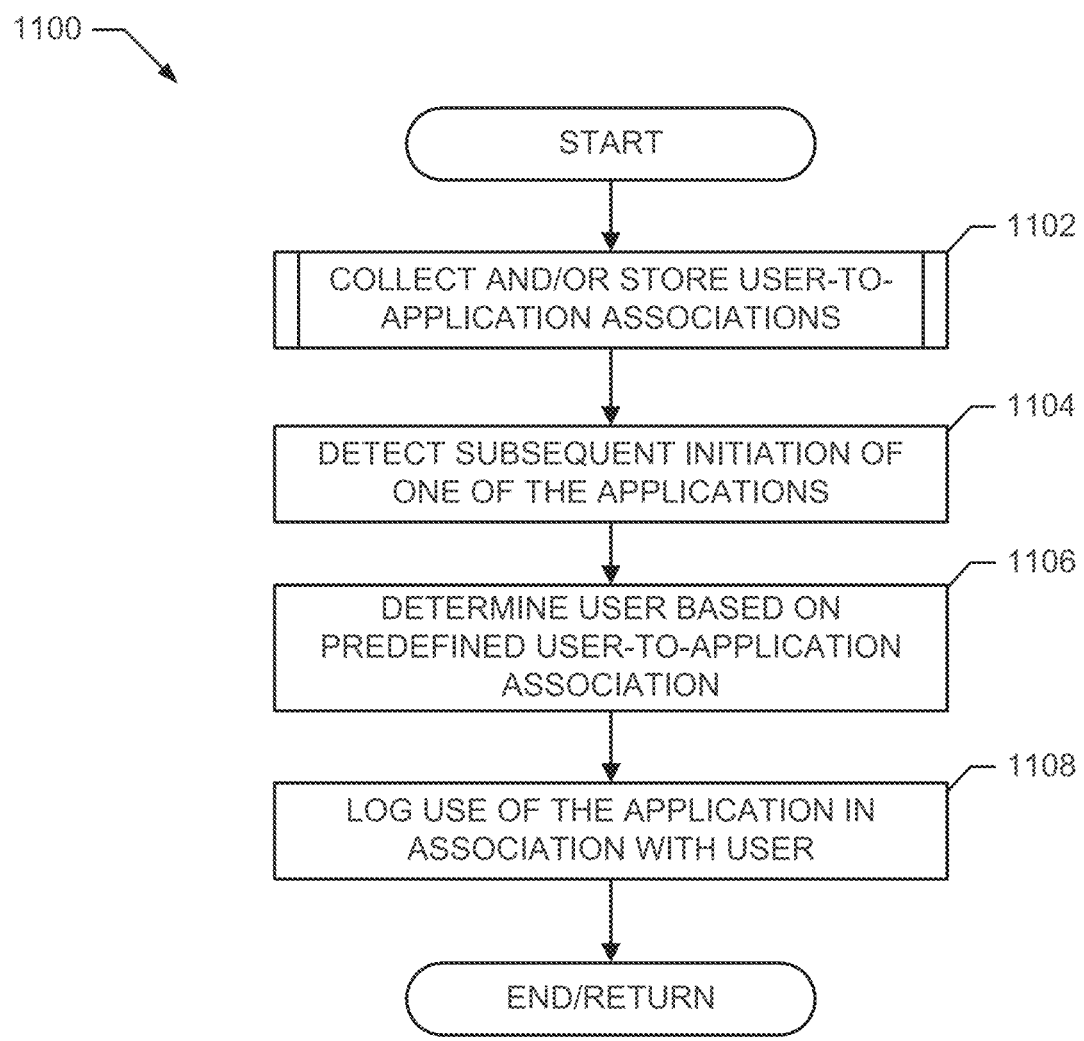
FIG. 11 is a flow diagram representative of example machine readable instructions that may be executed to implement the example user-to-application associator of FIG. 3 to identify users of applications based the collected user-to-application associations.

An example program 1100 of FIG. 11 begins after an authorized user logs into the user-identification application 208 (FIG. 2). The example program 500 is executed to implement the user-to-application associator 200 (FIGS. 2 and 3) to log occurrences of application usage with user identifiers of users that were likely using the applications. Initially, at block 1102, the user-to-application associator 200 collects and/or records user-to-application associations. An example process that may be used to collect and/or record the user-to-application associations is described below in connection with FIG. 12. In some examples, the user-to-application associator 200 collects and/or records user-to-application associations before the corresponding applications are accessed. At block 1104, the user-to-application associator 200 detects when a to-be-monitored application is initiated or launched on the user device 100 (FIG. 2). At block 1106, the user-to-application associator 200 determines the user(s) of the initiated applications (e.g. the application 204 of FIG. 2) based on the previously stored user-to-application associations created at block 1102. At block 1108, the example user-to-application associator 200 logs use of the application in association with the user(s) determined at block 1106. The example program 1100 of FIG. 10 then ends.

Figure 12:
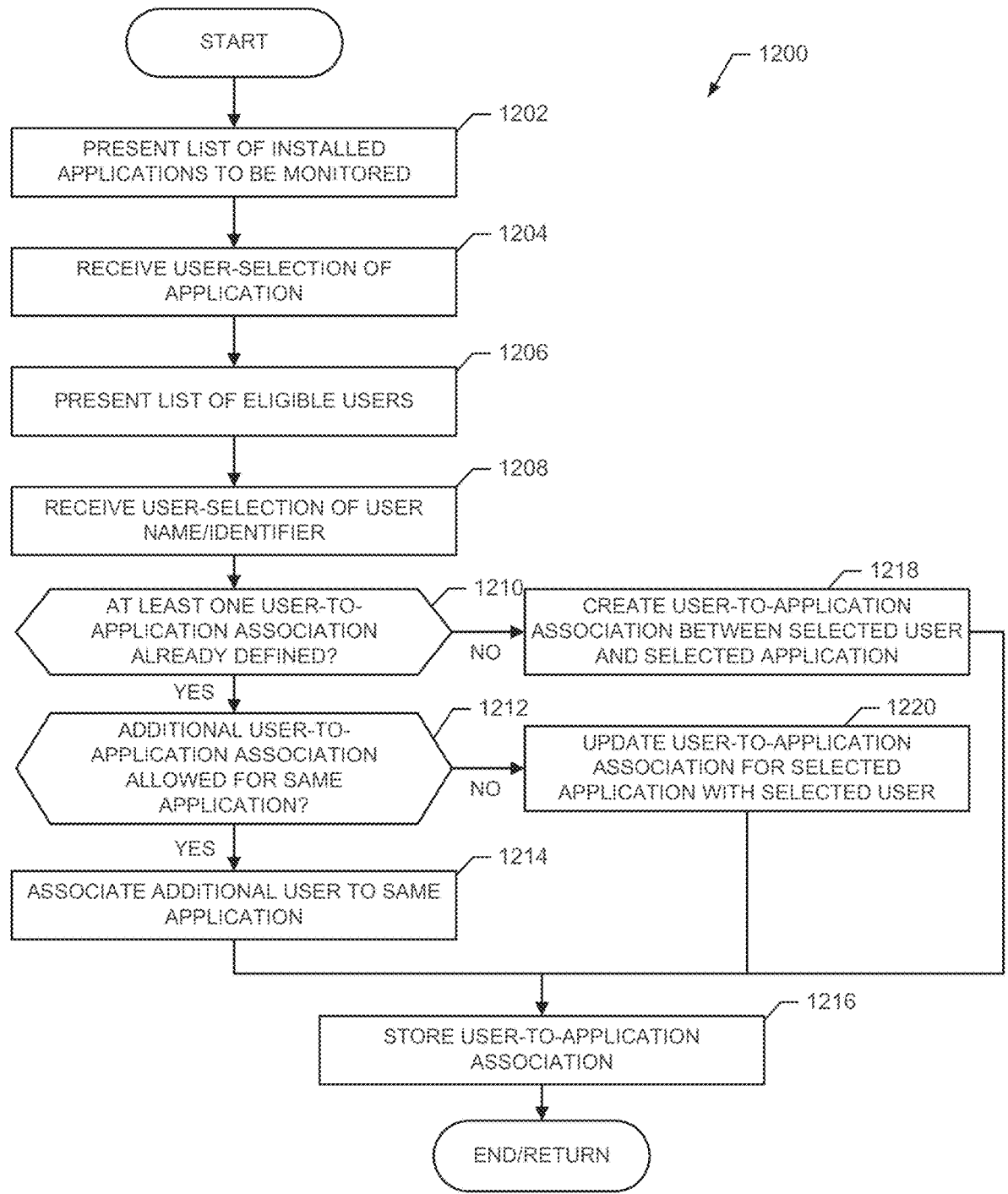
FIG. 12 is a flow diagram representative of example machine readable instructions that may be executed to implement the example user-to-application associator of FIG. 3 to collect and/or record user-to-application associations.

An example program 1200 of FIG. 12 is executed to implement the example user-to-application associator 200 (FIGS. 2 and 3) to collect and/or record user-to-application associations. Initially, at block 1202, the example user interface 304 (FIG. 3), through the user-identification application 208 (FIG. 2), displays a listing of to-be-monitored applications. For example, the user interface 304 may request the user-identification application 208 of FIG. 2 to display the to-be-monitored applications via a GUI (e.g. the example GUI 500 of FIGS. 5A and 5B). At block 1204, the example user interface 304 receives a user-selection of an application. For example, the user interface 304 may receive the name/title of an application selected by a user via the user-identification application 208. At block 1206, the example user interface 304 displays the list of eligible users. For example, the user interface 304 may cause the user-identification application 208 to display names/identifiers of household members via a GUI (e.g., the example GUI 500 of FIGS. 5A and 5B). At block 1208, the example user interface 304 receives a user-selection of a user name/identifier.

At block 1210, the example associator 300 (FIG. 3) determines if at least one user-to-application association is already defined for the user-selected application obtained at block 1204. If at least one user-to-application association is already defined, the example program 1200 proceeds to block 1212. At block 1212, the example associator 300 determines whether an additional user-to-application association can be defined for to the user-selected application selection obtained at block 1204. If the additional user-to-application association can be defined, control advances to block 1214. At block 1214, the example associator 300 creates the additional user-to-application association for the user-selected application. At block 1216, the example associator 300 stores the user-to-application association in, for example, the example data structure 400 of FIG. 4.

Returning to block 1210, if at least one user-to-application association is not defined for the user-selected application, control advances to block 1218. At block 1218, the example associator 300 creates a user-to-application association between the user-selected application obtained at block 1204 and the user-selected user name/identifier obtained at block

1208. At block 1216, the example associator 300 stores the user-to-application association in, for example, the example data structure 400 of FIG. 4.

Returning to block 1212, if an additional user cannot be associated to the same user-selected application received at block 1204, control advances to block 1220. At block 1220, the example associator 300 updates the user-to-application association to associate the user-selected application name/title received at block 1204 with the user-selected user name/identifier obtained at block 1208. At block 1216, the example associator 300 stores the user-to-application association in, for example, the example data structure 400 of FIG. 4. The example process of FIG. 12 then ends.

Figure 13:
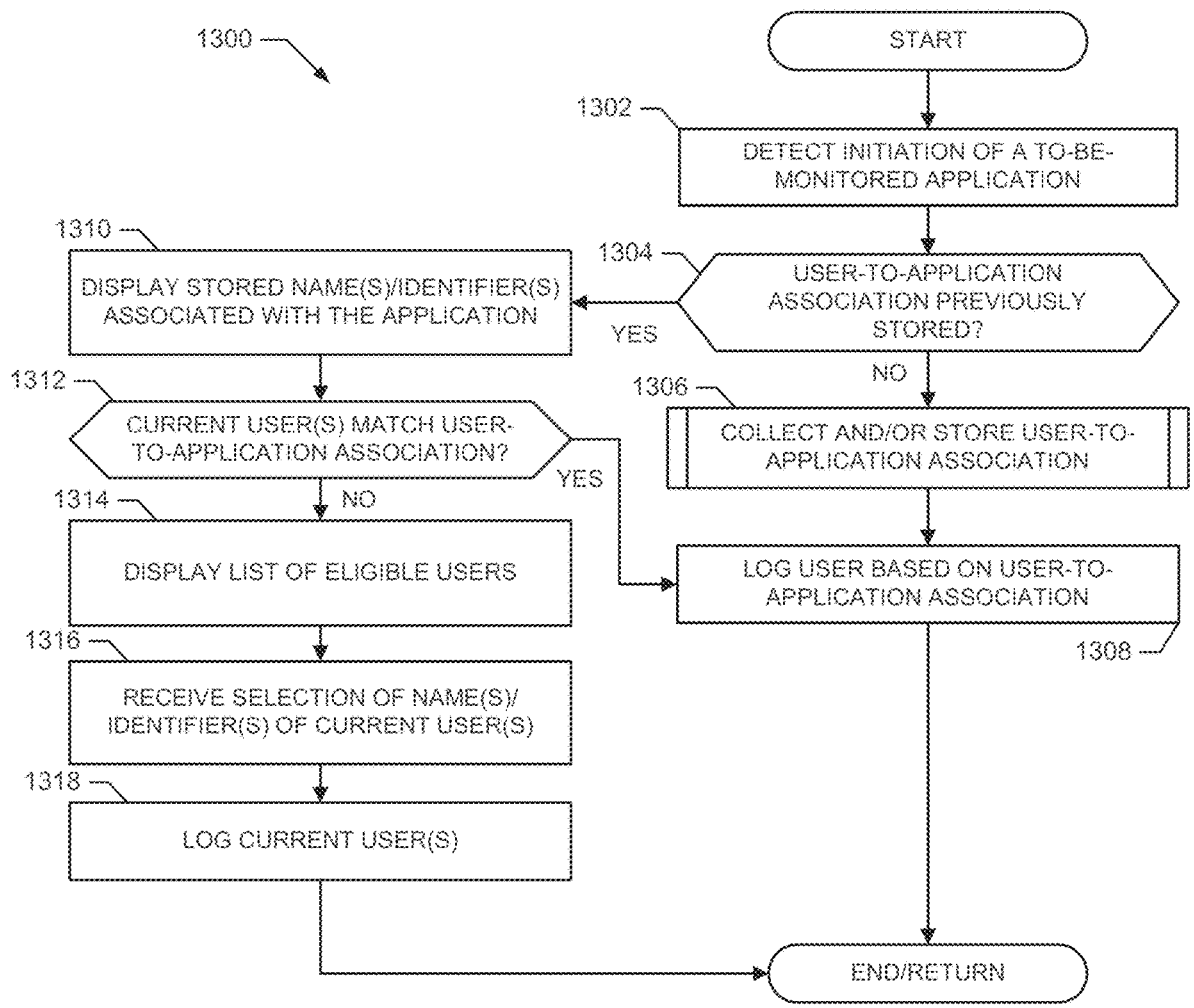
FIG. 13 is a flow diagram representative of example machine readable instructions that may be executed to implement the example user-to-application associator of FIG. 3 to associate a usage of an application with a user.

An example program 1300 of FIG. 13 may be used to implement the example user-to-application associator 200 (FIGS. 2 and 3) running in a background mode to detect application usage (e.g., usage of the application 204 of FIG. 2) and to associate usage of the application with user names/identifiers of the user(s) that are using the example user device 100 when the application is detected. At block 1302, the example application detector 302 (FIG. 3) detects the initiation of a to-be-monitored application. At block 1304, the example associator 300 (FIG. 3) determines whether a user-to-application association exists for the application detected at block 1302. If there is no stored user-to-application association, the example program 1300 control advances to block 1306. Otherwise, the example program 1300 control advances to block 1310. At block 1306, the example user-to-application associator 200 defines a user-to-application association for the application detected at block 1302. For example, the user-to-application associator 200 may create the user-to-application association using the example program 1200 of FIG. 21. The example program 1300 proceeds to block 1308. At block 1308, the example program 1300 logs the user name(s)/identifier(s) based on the user-to-application association defined at block 1306. The example program 1300 then ends.

At block 1310, when a previously stored user-to-application association is detected at block 1304, the example user interface 304 (FIG. 3) displays the user name(s)/identifier(s) associated with the application detected at block 1302. At block 1312, the associator 300 determines whether the displayed user name(s)/identifier(s) of the previously stored user-to-application associations match(es) the current user(s) of the user device 100. If a current user of the user device 100 indicates that the displayed user name(s)/identifier(s) of the previously stored user-to-application association match(es) the current user(s) of the user device 100, the example program 1300 proceeds to block 1308. At block 1308, the example associator 300 logs use of the application based on the previously stored user-to-application association confirmed at block 1312. In some examples, the current user(s) of the user device 100 may indicate that the displayed user name(s)/identifier(s) match the previously stored user-to-application association by not interacting with the user interface 304.

Returning to block 1312, if the current user(s) indicated that the current user(s) does not match the displayed user name(s)/identifier(s), the example program 1300 proceeds to block 1314. At block 1314, the example user interface 304 presents a list of eligible users. For example, the user interface 304 may request the user-identification application 208 to display the user name(s)/identifier(s) of household members of a household with which the user device 100 is associated. At block 1316, the user interface 304 receives a user-selection of name(s)/identifier(s) of current user(s) of the user device 100. At block 1318, the example associator 300 logs use of the detected application in association with current user(s) that were confirmed. The example program 1300 then ends.

Figure 14:
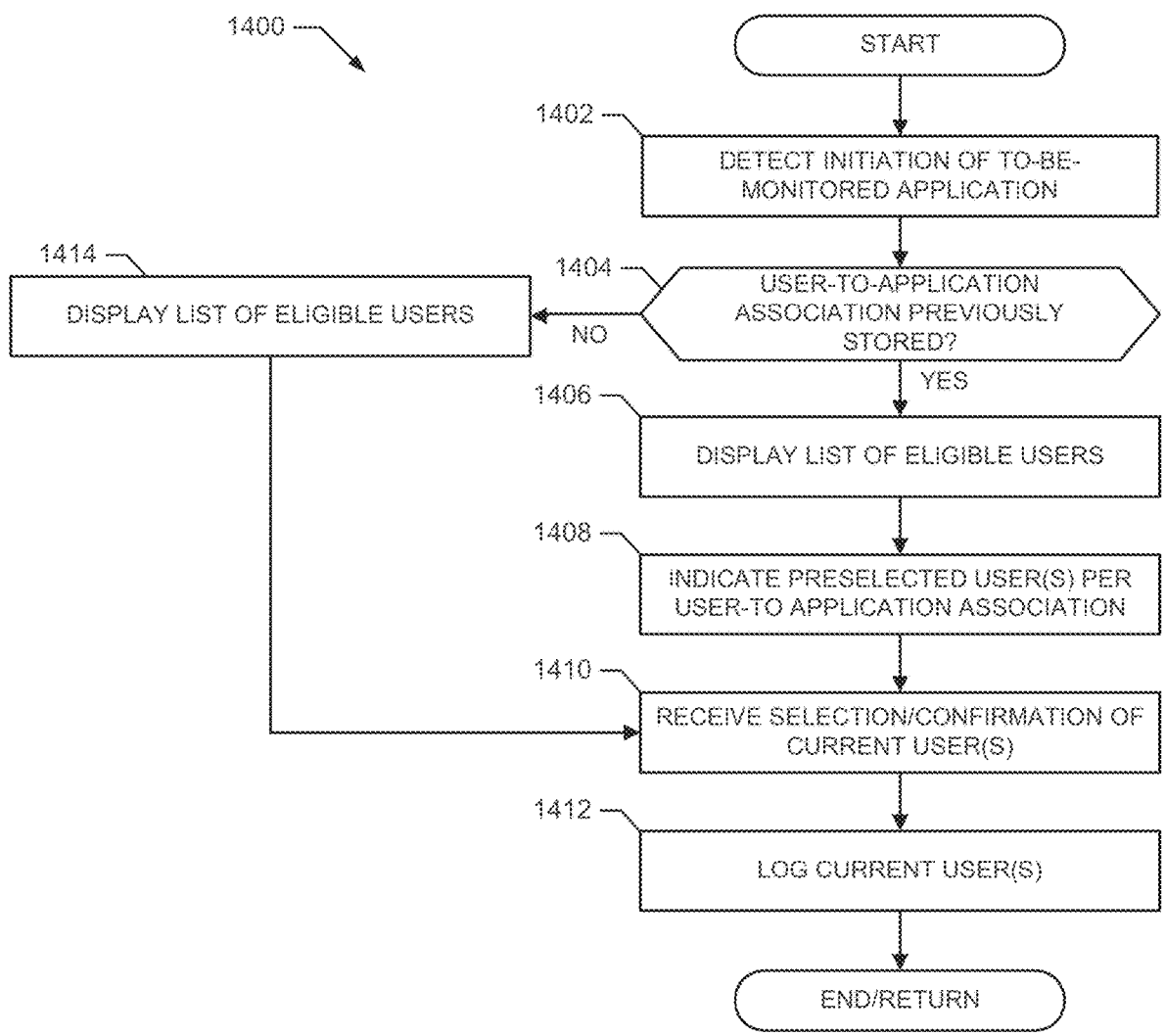
FIG. 14 is a flow diagram representative of example machine readable instructions that may be executed to implement the example user-to-application associator of FIG. 3 to associate a usage of an application with a user.

An example program 1400 in FIG. 14 may be used to implement the example user-to-application associator 200 (FIGS. 2 and 3) as a background process executing in the user device 100. The example program 1400 may be used to confirm a previously stored user-to-application association and/or collect and/or record a new user-to-application association for an application upon detecting an initiation of the application.

Initially, at block 1402, the example application detector 302 (FIG. 3) detects the initiation of a to-be-monitored application (e.g., the application 204 of FIG. 2). At block 1404, the example associator 300 (FIG. 3) determines whether a user-to-application association has been previously created for the detected to-be-monitored application detected at block 1402.

If a user-to-application association already exists for the to-be-monitored application 204, the example program 1400 proceeds to block 1406. At block 1406, the example user interface 304 (FIG. 3) displays user name(s)/identifier(s) of eligible users. At block 1408, the user interface 304 (FIG. 3) indicates preselected user name(s)/identifier(s) based on the previously stored user-to-application association for the application detected at 1302. For example, the user interface 304 requests the user-identification application 208 to indicate (e.g., using a highlight display property, a font effect, etc.) the preselected user name(s)/identifier(s) on the name(s)/identifier(s) displayed at block 1406. The example program 1400 then proceeds to block 1410.

Returning to block 1404, if a user-to-application association for the application detected at block 1402 does not already exist, the example program 1400 proceeds to block 1414. At block 1414, the example user interface 304 displays user name(s)/identifier(s) of eligible users. The example program 1400 then proceeds to block 1410.

At block 1410, the example user interface 304 receives a user-input selection(s) and/or a user-input confirmation(s) of user name(s)/identifier(s) of the current user(s) of the user device 100. At block 1412, after receiving the selection(s)/confirmation(s), the associator 300 logs the user name(s)/identifier(s) of the current user(s) of the user device 100. In some examples, the associator 300 uses the received user name(s)/identifiers to create a new user-to-application association for the application detected at block 1402 or to update a previously created user-to-application association for the application detected at block 1402. In this manner, such user-to-application association can be used to identify users of the application during subsequent launches or initiations of the application. The example program 1400 then ends.

Figure 15:
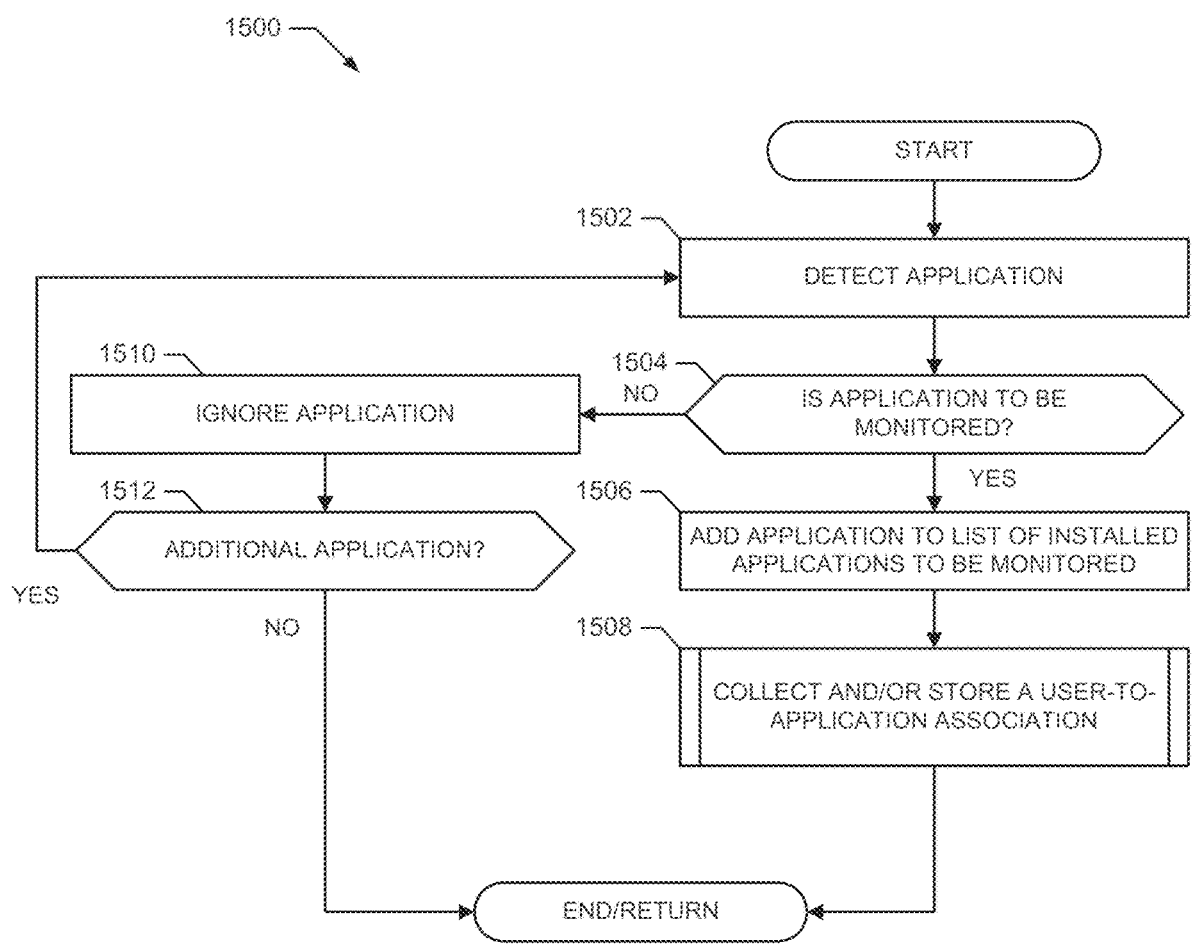
FIG. 15 is a flow diagram representative of example machine readable instructions that may be executed to implement the example user-to-application associator of FIG. 3 to maintain a list of applications to be monitored and to collect user-to-application associations based on the monitored applications.

An example program 1500 of FIG. 15 may be used to implement the example user-to-application associator 200 (FIGS. 2 and 3) running in a background mode to detect to to-be monitored applications installed on the example user device 100 (FIG. 2) and/or to collect and/or record user-to-application associations for the to-be monitored applications. Initially, at block 1502, the example application detector 302 (FIG. 3) detects new applications installed on the example user device 100. In some examples, the application detector 302 may detect the installation of a new application, may from time to time monitor installed applications, and/or may check installed applications when the application detector 302 receives an update from the application database 106.

At block 1504, the example application detector 302 compares the detected application to the application names/titles and/or characteristics of to-be-monitored applications received from the application database 106 to determine if the detected application is a to-be-monitored application (e.g., the application 204 of FIG. 2). If the detected application is a to-be-monitored application, the example program proceeds 1500 to block 1406. At block 1506, the example application detector 302 adds the detected application to the listing of to-be-monitored applications that are detected as installed on the user device 100. At block 1508, the example user-to-application associator 200 then prompts the user to provide the user-to-application association for the new application. For example, the user-to-application associator 200 may provide the user-to-application association using the example program 1200 of FIG. 12. The example program 1500 then ends.

Returning to block 1504, if the detected application is not a to-be-monitored application, control advances to block 1510. At block 1510, the application detector 302 ignores the detected application. At block 1512, the example application detector 302 determines if there are more applications to detect. If there are more applications to detect, control returns to block 1402. If there are no more applications to detect, the example program 1500 ends.

An example program 1600 of FIG. 16 may be executed to implement the example application meter 202 (FIGS. 2 and 8) integrated into an application (e.g., application 204 of FIG. 2) to collect application reporting data and periodically and/or sporadically send the application reporting data to the AME 102 to be stored in the application reporting database 110 (FIG. 1). In some examples, the example program 1600 is executed when the application is launched. Additionally or alternatively, the example program 1600 may be executed when the application is presenting media (e.g., streaming television programs, music, movies, and/or advertisements). In some examples, the example program stores the application reporting data in the example data structure 900 (FIG. 9).

Initially, at block 1602, the example application meter 202 collects application/media data (e.g., the collected application/media data 910 of FIG. 9) from the application. The collected application/media data may take any form defined by the AME 102 and/or the application developer (e.g., hash keys, metadata, XML formatted lists, etc.). At block 1604, the example application meter 202 associates the collected application/media data with an application identifier (e.g., the application identifier 902 of FIG. 9) of the application being metered. At block 1606, the example application meter 202 logs the collected application/media data with the device ID 206 retrieved from the example user device 100 associated with the application meter 202. At block 1608, the example application meter 202 logs a start time 906 (FIG. 9) and an end time 909 (FIG. 9) associated with a usage of the application (e.g., usage entries 904 from FIG. 9). In the illustrated example, at block 1610, the example application meter 202 sends the application name/identifier 902, the collected application/media data 910, the device ID 206, the start time 906, and/or the end time 908 to the AME 102 as the application reporting data to be stored in the application reporting database 110. The example program 1600 then ends.

An example program 1700 of FIG. 17 may be executed to implement the example reporter 116 (FIGS. 1 and 10) to generate device-level viewing reports using example demographic data 120 from the panelist database 114, application reporting data from example application reporting database 110, and/or user-to-application associations from the example user-to-application association database 112 of FIG. 1. Initially, at block 1702, the example reporter 116 retrieves the application reporting data from the application reporting database 110 corresponding to the device ID 206 of a device (e.g., user device 100 of FIG. 2) for which the viewing report is being generated. At block 1704, the example reporter 116 retrieves the user-to-application association data from the user-to-application database 112 corresponding to the device identification 206 of the example user device 100. At block 1606, the example reporter 116 retrieves the demographic data 120 from the panelist database 114 for the users associated with the device ID 206 of the device (e.g., household members of a household in which the device is located).

In the illustrated example, at block 1708, the example time information generator 1002 calculates dates of usage 1008 and durations of usage 1010 of FIG. 10. In some examples, the time information generator 1002 uses the start timestamps 906 and the end timestamps 908 from the application reporting data of FIG. 9 to determine the date of usage 1008 and the duration of usage 1010. At block 1710, the example collected data analyzer 1004 retrieves the reference metadata 1012 from the reference database 106 corresponding to the collected application/media data 910 of FIG. 9 (e.g., application developer, application publisher, media delivery provider, application name/title, application identifier, media channel, media titles, etc.). At block 1712, for each usage of the user device 100, the example reporter 116 associates the demographic data 120, the date of usage 1008, the duration of usage 1010, and the reference metadata 1012. At block 1714, the example reporter 116 compiles the example viewing report data for the user device 100. In some examples, the example reporter 116 compiles the example viewing report data as shown in the example data structure 906 of FIG. 9. The example program 1700 then ends.

An example program 1800 of FIG. 18 may be executed to implement the example reporter 116 (FIGS. 1 and 10) to compile an application-level viewing report 118 for an application. Initially, at block 1802, the example reporter 116 generates a combined view report based on device-level viewing reports corresponding to multiple devices (e.g. user devices 100a-100d). Such device-level viewing reports may be generated using the flow diagram of FIG. 17. In some examples, the reporter 116 combines multiple device-level viewing report data structures 1006. At block 1804, the example reporter 116 retrieves data from the combined viewing report corresponding to a particular to-be-monitored application (e.g. application 204 of FIG. 2). In some examples, the example reporter 116 retrieves the viewing report data from the combined device-level viewing report based on the name/title and/or other characteristics of the application. At block 1806, using the retrieved data from the combined viewing report, the example reporter 116 generates the application-level viewing report 118 for the application. In some examples, the application-level viewing report 118 contains viewing report data associated with multiple households. The example program 1800 then ends.

As mentioned above, the example processes of FIGS. 11, 12, 13, 14, 15, 16, 17, and/or 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11, 12, 13, 14, 15, 16, 17, and/or 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 19:
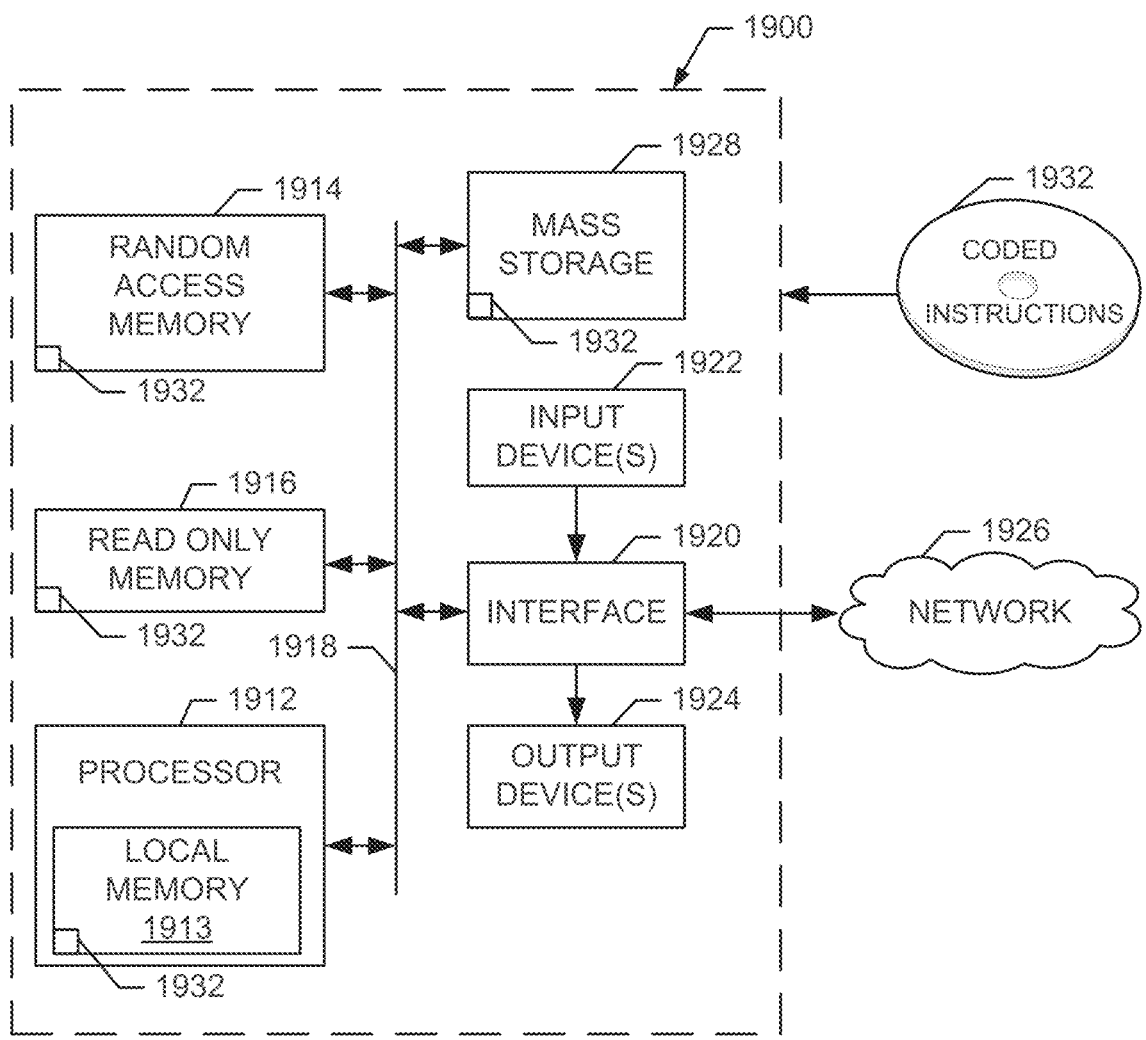
FIG. 19 is a block diagram of an example processor system that may execute any of the machine readable instructions represented by FIGS. 11-18 to implement the apparatus of FIGS. 1, 2, 3, 8 and/or 10.

FIG. 19 is a block diagram of an example processor platform 1900 capable of executing the instructions of FIGS. 11, 12, 13, 14, and 15 to implement the example user-to-application associator 200 of FIGS. 2 and 3. The example processor platform 1900 is also capable of executing the instructions of FIG. 16 to implement the application meter 202 of FIGS. 2 and 8. Further, the example processor platform 1900 is also capable of executing the instructions of FIGS. 17 and/or 18 to implement the reporter 116 of FIGS. 1 and 10. The processor platform 1900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives.

The coded instructions 1932 of FIGS. 11, 12, 13, 14, 15, 16, 17, and/or 18 may be stored in the mass storage device 1928, in the volatile memory 1914, in the non-volatile memory 1916, and/or on a removable tangible computer readable storage medium such as a CD or DVD.

From the foregoing, it will be appreciated that examples have been disclosed above which allow less intrusive metering of an application. That is, examples disclosed above allow applications on a device to be metered without requiring a panelist to remember an identification number. Additionally, examples have been disclosed which allow an audience measurement entity to associate demographic data with usage of applications by different panelists on a device without requiring the panelist to provide identification when the applications on the device are launched Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting, with an application detector executed by a processor of a device, applications to be monitored on the device by comparing a list of applications to be monitored with applications installed in memory of the device;
   receiving, with an associator application executed by the processor of the device, user inputs identifying associations between the applications to be monitored on the device and eligible users of the device;

determining, with the associator application executed by the processor of the device, user identification associated with a first application, the first application detected using an integrated meter, the determining performed without making a user query via a user interface when the first application is included in the applications to be monitored;

making the user query via the user interface to determine user identification information associated with the first application when (1) the first application is not included in the applications to be monitored, or (2) a current user of the device is not associated with the first application according to the associations between the applications and the eligible users; and crediting, based on the user identification information, the current user with using the first application, wherein the user identification information is not based on a panelist-provided identification number.

2. The method of claim 1, further including recording, in the memory of the device, the associations before the applications to be monitored are initiated.

3. The method of claim 1, further including detecting, with the integrated meter that facilitates tracking usage of the first application, an initiation of the first application on the device.

4. The method of claim 1, wherein the user inputs are inputs via a user interface of the associator application displayed on a display of the device.

5. The method of claim 1, wherein the user identification is determined based on a first one of the associations between the applications and the eligible users, wherein the user identification is associated with a newly installed application when the application detector identifies addition of the newly installed application to an application database present on the device.

6. The method of claim 1, wherein the receiving of the associations between the applications to be monitored and the eligible users via the user interface includes:
presenting the list of applications via a display; and
receiving the user inputs as selections of primary users associated with respective ones of the applications.

7. The method of claim 6, further including:
receiving selections of second users; and
associating the second users as secondary users associated with the respective ones of the applications.

8. An apparatus comprising:
an application detector to detect a plurality of applications installed on a user device, the applications to be monitored for usage;
a user interface presented on a display of the user device, the user interface to receive user input indicating a selection of one or more eligible users to be associated with at least a first application of the plurality of applications to be monitored, the user input received before the first application is initiated; and
an associator in communication with the application detector and a communication interface, the associator to:
determine user identification associated with the first application without making a user query via the user interface when the first application is included in the applications to be monitored;
make the user query via the user interface to determine user identification information associated with the first application when (1) the first application is not included in the applications to be monitored, or (2) a current user of the user device is not associated with the first application according to the association between the first application and the one or more eligible users; and
credit, based on the user identification information, the current user with using the first application, wherein the user identification information is not based on a panelist-provided identification number.

9. The apparatus of claim 8, wherein the associator is to record an association between the one or more eligible users and the first application before the first application is initiated.

10. The apparatus of claim 8, wherein the associator is to detect, with an integrated meter that is to facilitate tracking usage of the first application, an initiation of the first application on the user device.

11. The apparatus of claim 10, wherein the associator is to determine the user identification associated with the first application after the first application is initiated on the user device as detected using the integrated meter.

12. The apparatus of claim 8, wherein the user identification is determined based on the association between the first application and the one or more eligible users, the user identification associated with a newly installed application when installation is detected based on detection of addition of the first application in an application database present on the user device.

13. The apparatus of claim 8, wherein the application detector is to identify the applications to be monitored by comparing application identifiers from an application database with application identifiers of applications installed on the user device.

14. The apparatus of claim 13, wherein the application detector is further to detect initiations of the applications on the user device to be monitored for usage.

15. A tangible computer readable storage medium comprising instructions which, when executed, cause a processor of a device to at least:
after a first application is initiated on the device as determined using an integrated meter that facilitates tracking usage of the first application:
determine user identification associated with the first application, the first application detected using the integrated meter, without making a user query via a user interface when the first application is included in applications to be monitored, the user identification determined based on a first one of associations between the applications and eligible users;
make the user query via the user interface to determine user identification information associated with the first application when (1) the first application is not included in the applications, or (2) a current user of the device is not associated with the first application according to the associations between the applications and the eligible users; and
credit, based on the user identification information, the current user with using the first application, wherein the user identification information is not based on a panelist-provided identification number.

16. The tangible computer readable storage medium of claim 15, wherein, before the first application is initiated on the device, the instructions further cause the processor to at least execute a second application on the device to receive user inputs via a user interface of the second application displayed on a display of the device, the user inputs identifying associations between eligible users of the device and the applications to be monitored.

17. The tangible computer readable storage medium of claim 16, wherein the second application is to prompt for selection of a primary user from a list of the eligible users and creates the association between the primary user and the first application based on the selection.

18. The tangible computer readable storage medium of claim 16, wherein the second application is to create a plurality of associations between a plurality of primary users and a respective plurality of applications.

19. The tangible computer readable storage medium of claim 16, wherein the instructions further cause the processor to at least record the associations before the applications to be monitored are initiated.

20. The tangible computer readable storage medium of claim 15, wherein the user identification is associated with a newly installed application when installation is detected based on detection of addition of the first application in an application database on present the device.

\* \* \* \* \*